(12) United States Patent
Yu et al.

(10) Patent No.: US 10,333,413 B2
(45) Date of Patent: Jun. 25, 2019

(54) SYSTEM AND METHOD FOR AUTOMATICALLY AND ADAPTIVELY ENHANCING TRANSIENT RESPONSE FOR A PLURALITY OF OUTPUT VOLTAGES

(71) Applicant: Dell Products, LP, Round Rock, TX (US)

(72) Inventors: Wei-Cheng Yu, New Taipei (TW);
Merle J. Wood, Round Rock, TX (US);
Adie Tan, Austin, TX (US);
Tsung-Cheng Liao, Taoyuan (TW);
Tun-Chieh Liang, Taipei (TW)

(73) Assignee: Dell Products, LP, Round Rock, TX (US)

( * ) Notice: Subject to any disclaimer, the term of this patent is extended or adjusted under 35 U.S.C. 154(b) by 111 days.

(21) Appl. No.: 15/498,051

(22) Filed: Apr. 26, 2017

(65) Prior Publication Data
US 2018/0316272 A1 Nov. 1, 2018

(51) Int. Cl.
| | |
|---|---|
| *G06F 1/32* | (2019.01) |
| *H02M 3/335* | (2006.01) |
| *G06F 1/26* | (2006.01) |
| *G06F 1/3287* | (2019.01) |
| *G06F 1/3296* | (2019.01) |
| *H02M 1/00* | (2006.01) |

(52) U.S. Cl.
CPC .......... *H02M 3/33523* (2013.01); *G06F 1/26* (2013.01); *G06F 1/263* (2013.01); *G06F 1/3287* (2013.01); *G06F 1/3296* (2013.01); *H02M 3/33515* (2013.01); *H02M 2001/0025* (2013.01)

(58) Field of Classification Search
CPC ................................................ H02M 3/33523
See application file for complete search history.

(56) References Cited

U.S. PATENT DOCUMENTS

| | | | |
|---|---|---|---|
| 3,320,512 A | 5/1967 | Kruger | |
| 4,622,629 A | 11/1986 | Glennon | |
| 5,805,012 A | 9/1998 | Jeon | |
| 6,583,609 B1 * | 6/2003 | Pardoen | ................ H02M 3/156 323/283 |

(Continued)

*Primary Examiner* — Mohammed H Rehman
(74) *Attorney, Agent, or Firm* — Prol Intellectual Property Law, PLLC; H. Kenneth Prol

(57) ABSTRACT

A system and method of operating an automatic variable voltage transient response management system comprising a switchable power regulator circuit for receiving an input voltage and generating a plurality of output voltages for an information handling system the switchable power regulator circuit including a feedback loop for an adaptable error amplifier circuit, and a memory for storing a control circuit resistance table wherein each of the plurality of output voltages are associated in the control circuit resistance table with one of a plurality of total control circuit resistance values to adapt the error amplifier circuit feedback gain, and a digital core processor executing code instructions of the automatic variable voltage transient response management system to determine a requested regulated output voltage, identify one of the plurality of the total control circuit resistances associated with the requested regulated output voltage of the plurality of output voltages in the controller resistance table, and to activate an adaptable resistance control circuit to apply the identified total control circuit resistance.

20 Claims, 9 Drawing Sheets

(56) References Cited

U.S. PATENT DOCUMENTS

| | | | | |
|---|---|---|---|---|
| 7,046,528 B2 * | 5/2006 | Sankman | ............... | H02M 3/00 |
| | | | | 323/222 |
| 7,982,447 B2 | 7/2011 | Chellamuthu | | |
| 8,604,756 B2 | 12/2013 | Dooley | | |
| 2002/0036486 A1 * | 3/2002 | Zhou | ..................... | G05F 1/62 |
| | | | | 323/272 |
| 2006/0001408 A1 * | 1/2006 | Southwell | ........... | H02M 3/1584 |
| | | | | 323/282 |
| 2010/0085024 A1 | 4/2010 | Houston | | |
| 2016/0013719 A1 * | 1/2016 | Babazadeh | ........... | H02M 3/157 |
| | | | | 323/271 |

* cited by examiner

| $R_{OCD}$ | $R_2$ | $R_6$ | $R_8$ | $R_{OC}$ TOTAL | PD VOLTAGE OUTPUT |
|---|---|---|---|---|---|
| 1 | 0 | 0 | 0 | $R_{OC} = \left(\frac{1}{R_{OCD}}\right)^{-1}$ | LATCH |
| 1 | 0 | 0 | 1 | $R_{OC} = \left(\frac{1}{R_{OCD}} + \frac{1}{R_8}\right)^{-1}$ | 20V |
| 1 | 0 | 1 | 0 | $R_{OC} = \left(\frac{1}{R_{OCD}} + \frac{1}{R_6}\right)^{-1}$ | 15V |
| 1 | 1 | 0 | 0 | $R_{OC} = \left(\frac{1}{R_{OCD}} + \frac{1}{R_2}\right)^{-1}$ | 15V |
| 1 | 0 | 1 | 1 | $R_{OC} = \left(\frac{1}{R_{OCD}} + \frac{1}{R_6} + \frac{1}{R_8}\right)^{-1}$ | 9V |
| 1 | 1 | 0 | 1 | $R_{OC} = \left(\frac{1}{R_{OCD}} + \frac{1}{R_2} + \frac{1}{R_8}\right)^{-1}$ | 9V |
| 1 | 1 | 1 | 0 | $R_{OC} = \left(\frac{1}{R_{OCD}} + \frac{1}{R_2} + \frac{1}{R_6}\right)^{-1}$ | 5V |
| 1 | 1 | 1 | 1 | $R_{OC} = \left(\frac{1}{R_{OCD}} + \frac{1}{R_2} + \frac{1}{R_6} + \frac{1}{R_8}\right)^{-1}$ | 5V |

SYSTEM AND METHOD FOR AUTOMATICALLY AND ADAPTIVELY ENHANCING TRANSIENT RESPONSE FOR A PLURALITY OF OUTPUT VOLTAGES

FIELD OF THE DISCLOSURE

The present disclosure generally relates to information handling systems, and more particularly relates to a system for managing transient response of a regulated output signal having one of a plurality of voltages, for providing a soft start upon switching from one regulated output signal voltage to another of the plurality of voltages, and for protecting load devices from over voltage conditions.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components. The information handling system may include telecommunication, network communication, and video communication capabilities. Further, the information handling system may include a power supply unit with a voltage regulator circuit and an error (EA) amplification circuit operating to optimize the crossover frequency of an output power signal.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a graphical diagram illustrating a lookup table according to an embodiment of the present disclosure;

The use of the same reference symbols in different drawings may indicate similar or identical items.

DETAILED DESCRIPTION OF THE DRAWINGS

Figure 1:
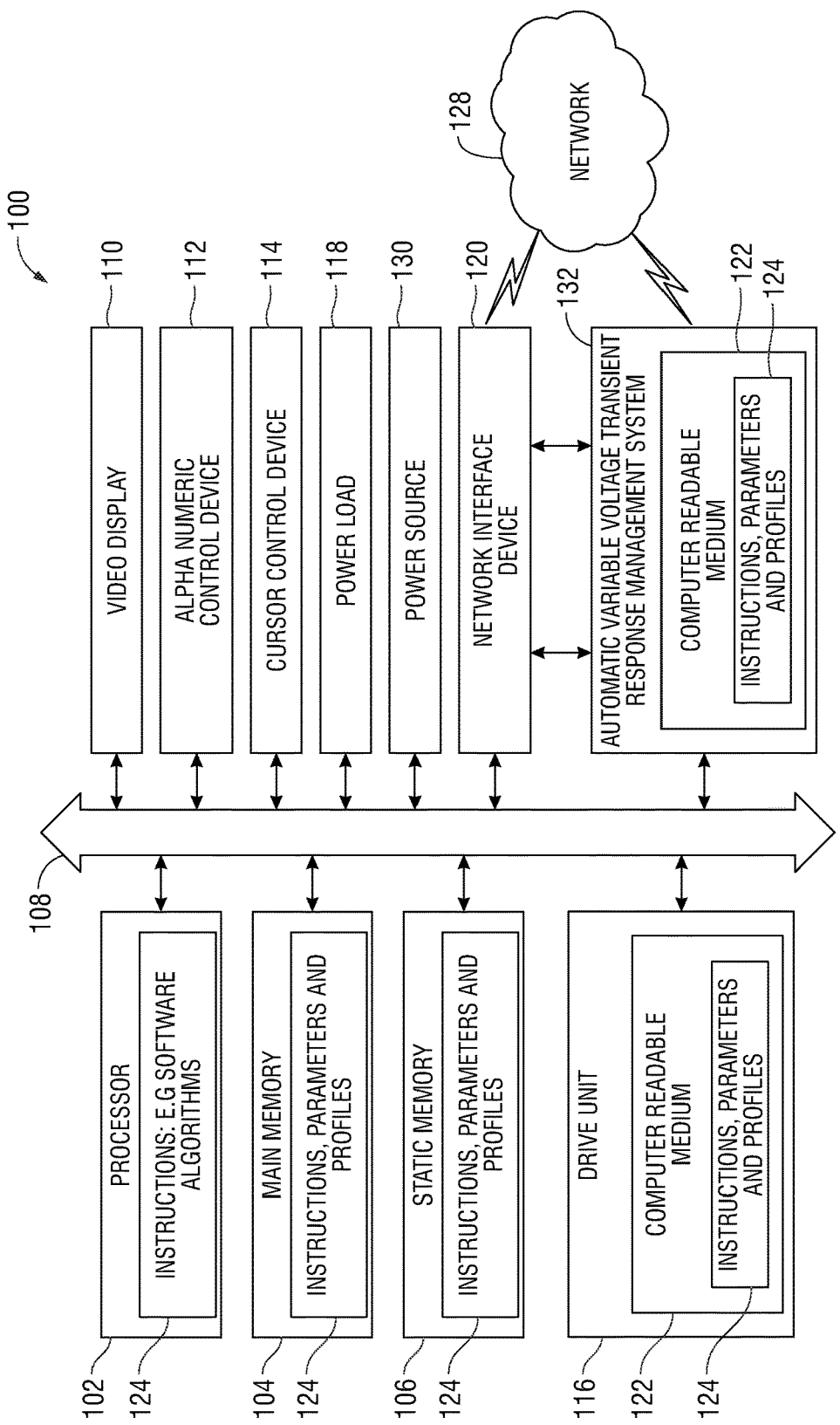
FIG. 1 is a block diagram illustrating a generalized embodiment of an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

The USB-C and USB Power Delivery standards define the cables, connectors and communications protocols used in a bus for connection, communication, and power supply between computers and electronic devices. Devices supporting USB Power Delivery (PD) standards may request higher currents and supply voltages from compliant hosts via PD aware USB cables. PD-aware devices implement a flexible power management scheme by interfacing with the power source through a bi-direction data channel and requesting a certain level of electrical power. In one example embodiment, source output voltages including 5V, 9V, 15V, and 20V may be requested. Other power source output voltages are similarly contemplated as the USB-C and other USB standards are modified and develop further. The power source, or load in such a scenario may respond by changing its output voltage from one of the specific power levels available via the power supply system to another of these available power levels. Although power adapter devices employ control circuits designed to compensate for voltage transients caused by changes in load output voltages, each of those control circuits are designed to compensate for voltage transients associated with only one desired load output voltage. A method or apparatus is needed to compensate for voltage transients associated with a variety of requested load output voltages, for example, each of the four specific power levels available under the USB PD standard. For example, a switchable voltage regulator circuit as described in embodiments in the present disclosure may be useful for adaptability among several possible load output voltages.

Changes in power supply voltage may cause voltage transients that can be difficult to correct quickly enough to prevent over-voltage conditions on the power supply output. One method for correcting voltage transients is the use of an error amplifier circuit (EA circuit) in a feedback unidirectional voltage control circuit. In such a method, a sampled output voltage is fed back and compared to a stable reference voltage, and any measured difference between the two generates a compensating error voltage that tends to move the output voltage towards the design specification. For example, an EA circuit may be placed in a feedback unidirectional voltage control circuit with a pulse-width modulation circuit (PWM circuit) and a load, in which the EA circuit generates a reference signal and the A/C power source supplies an input signal to the PWM circuit. If the EA circuit detects a measured difference between the reference signal and the output signal of the PWM circuit, the EA circuit may compensate for this difference by altering the gain of the output signal in order to optimize its crossover frequency. By optimizing the crossover frequency of the output signal, the EA circuit may enhance the transient response of one desired output signal voltage by providing sufficient response with limited transient overshoot.

The crossover frequency is dependent upon the voltage of the output signal, and the optimal crossover frequency varies with the output voltage. Thus, the use of EA circuits in such a manner may enhance the transient response for a predetermined output voltage, but the EA circuit used in such a scenario must be designed specifically to enhance the transient response only for that predetermined output voltage. For example, an EA circuit designed to enhance the transient response for a 5V predetermined output voltage would not operate to enhance the transient response for a 20V predetermined output voltage. In fact, the EA circuit designed for a 5V output voltage may actually force a signal designed to generate a 20V output voltage to become unstable and unusable, because an optimal crossover frequency for an output signal having one voltage may be suboptimal or even work to propagate or amplify variations in the transient response of an output signal having another voltage.

The optimized crossover frequency a traditional EA circuit provides is closely correlated to a determination of which physical components to incorporate into the integrated EA circuit, and thus, once the design is set, the optimized crossover frequency cannot be modified without restructuring the physical components within. A method is needed to deliver a separate optimized crossover frequency for each of a variety of requested voltages, including the four specific USB Power Delivery voltages described above, without having to redesign the EA circuit each time a new power output is needed. One potential solution to this need is to design and operate multiple, different EA circuits, for example, each designed to deliver the optimized crossover frequency for one of the four specific USB Power Delivery voltages available under the standard. However, embodiments of this disclosure provide a simpler approach to this problem by using a single adaptable EA circuit to deliver each of the different optimized crossover frequencies for each of the four available USB Power Delivery voltages. The switchable voltage regulator circuit of embodiments of the present disclosure may include an adaptable EA circuit able to accommodate several possible requested output voltages. In particular embodiments of this disclosure, the adaptable EA circuit may be optimized to deliver the crossover frequencies of any number of a variety of requested output voltages, not just an example four specific USB Power Delivery voltages described in some embodiments herein.

The adaptable EA circuit in embodiments of this disclosure may include an octocoupler operably connected to one or more resistors, capacitors, or transistors. For example, as shown and described in further detail with reference to FIG. 2, an adaptable EA circuit of a switchable power regulator circuit may include at least an optocoupler (including a resistor with a resistance $R_C$ and a capacitor having a capacitance $C_C$), a first voltage reference device (including a resistor with a resistance $R_1$ and a capacitor having a capacitance $C_1$), a post signal compensation resistor (having a resistance $R_P$), and a control circuit resistor (having a resistance $R_{OC}$). The gain value for such an adaptable EA circuit may be a function of $R_C$, $C_C$, $R_1$, $C_1$, $R_P$, $R_{OC}$, and the current transfer ratio of the optocoupler (CTR). The gain value for the adaptable EA circuit may be altered by altering only the resistance of the adaptable resistance control circuit ($R_{OC}$), while keeping all other variables constant. Using an EA circuit with a preset and static physical component design to alter the gain of an output signal can optimize the phase/gain margin of the output signal for only one predetermined output voltage, and can have deleterious effects on all other predetermined output voltages. In contrast, changing the resistance of the adaptable resistance control circuit during operation of the adaptable EA circuit allows the EA circuit to alter the gain of an output signal dynamically, and to deliver an optimized crossover frequency of the output signal for multiple predetermined output voltages.

Adaptable resistance control circuits in embodiments of the present disclosure may include a plurality of resistors and transistors capable of operating in series or in partial series with one another. As an example, an adaptable resistance control circuit in one embodiment may include three low-resistance default resistors, arranged in series, having resistances $R_3$, $R_5$, and $R_7$, which may be used to control current to control transistors $Q_1$, $Q_2$, and $Q_3$ to enable additional resistances to be added to modify a total default control circuit resistance $R_{OCD}$. Each of the current limiting resistors $R_3$, $R_5$, and $R_7$ in such an embodiment may also be operably connected to a transistor and a controlled resistor pair. For example, resistor $R_3$ may be connected to a gate of transistor $Q_1$ and additional controlled resistor $R_2$, resistor $R_5$ may be connected to a gate of transistor $Q_2$ and additional controlled resistor $R_6$, and resistor $R_7$ may be connected to a gate of transistor $Q_3$ and additional controlled resistor $R_8$. Each transistor in an embodiment may operate to allow or disallow the flow of current through the additional controlled resistor with which it is paired, such as $R_2$, $R_6$, and $R_8$. In effect, each transistor may alter the total resistance of the control circuit $R_{OC}$ to implement the parallel resistance of one or a combination of the additional controlled resistors with which each of the transistors are paired. In such an embodiment, the adaptive resistance control circuit may be capable of generating eight different total control circuit resistances $R_{OC}$, including a default control circuit resistance $R_{OCD}$, and seven potential combinations of $R_{OCD}$ with one or more of $R_2$, $R_6$, and $R_8$. During the design phase of the adaptable EA circuit and control circuit, the total control circuit resistance $R_{OC}$ associated with each of these combinations may be stored in a lookup table, and each combination (or each resultant $R_{OC}$) may be associated with one of the four available USB PD output voltages, the crossover frequency of which that combination (or resultant $R_{OC}$) may optimize a feedback gain. In such a way, the control circuit resistance may be altered during operation of the EA circuit so as to optimize the crossover frequency of the signal output from the PWM circuit for a variety of requested output voltages, including each of the USB PD output voltages, as a new output voltage is requested.

Further, in such an embodiment, each of the default resistors $R_3$, $R_5$, and $R_7$ may be operably connected via a general process input output line to a digital core of a power adapter that includes a processor operating code instructions of an automatic variable voltage transient response management system. The digital core of the power adapter in an embodiment may also include a memory for storing the lookup table described directly above. The automatic variable voltage transient response management system in an embodiment may operate to receive information describing the desired output voltage from a USB PD compatible device via a communication channel operably connected to the digital core of the power adapter. The automatic variable voltage transient response management system in such an embodiment may then access the lookup table stored in memory of the digital core, and determine which of the eight combinations of resistors the control circuit should employ in order to optimize the crossover frequency of an output signal having the desired output voltage. Then the automatic variable voltage transient response management system may transmit an instruction to each transistor associated with the resistors in the chosen combination to allow current to pass through those resistors, thus increasing or decreasing the resultant control circuit resistance $R_{OC}$. In such a way, the control circuit in an embodiment may operate in tandem with the automatic variable voltage transient response management system to alter the gain of the adaptable EA circuit, optimize the crossover frequency of the output signal, and thus enhance the transient response of the output signal for a plurality of desired output voltages, immediately upon notification of the value of the desired output voltage, and during operation of the adaptable EA circuit.

Dynamic alteration of the control circuit resistance during operation of the EA circuit, in combination with a soft start circuit in embodiments of the present disclosure also provides a solution to voltage overshooting as a result of high inrush of electrical current at start up. As power is first applied to a circuit, the capacitors must be charged from zero to their final values, and the inductors, transformers, and other active components must move from inactive to active states. These changes cause the input impedance of the circuit to appear as being very low, thereby causing large inrush currents of up to 7-10 times higher than running current to flow. This occurs prior to establishment of the feedback loop operating to regulate the transient response of the output signal. High currents and current peaks associated with the inrush currents described above lead to increased stress and wear and tear on physical circuitry, leading to shorter life cycles for physical components. A solution is needed to limit the inrush current at startup and to limit voltage overshoots.

In embodiments of the present disclosure, a soft start circuit may be used in combination with the adaptable EA circuit to eliminate these undesired side effects. Such a soft start circuit may operate by increasing the duty cycle at start up from zero to the default DC maximum at turn on, which causes the primary current and output voltage to rise in an orderly manner and allows time for the adaptable EA circuit to regulate the output signal. In an example embodiment, the soft start circuit may control voltage and current rises through control of the total control circuit resistance $R_{OC}$ and a capacitance $C_{SOFT}$ may act to limit over shoot. Causing the primary current and output voltage to rise in an orderly manner in an embodiment may reduce stress on physical components such as MOSFETs, clamp circuits, and output diodes, resulting in longer life cycles of those components. Thus, the combination of the soft start circuit induced linear rise of current and voltage with the adaptable EA circuit induced optimization of output voltage phase/gain margin provides the solution to the problem of high inrush currents and voltage overshoots at startup.

Dynamic alteration of the control circuit resistance during operation of the EA circuit in response to a detected over voltage condition, in combination with the soft start circuit in embodiments of the present disclosure also provides an alternative to a separate over voltage protection circuit, thereby negating the need for extra parts. Voltage protection circuits of the present embodiment may take one of many forms, but perform the basic operation of detecting a voltage exceeding a preset threshold, and in response, closing or latching a circuit gate, sending the incoming overvoltage signal to ground and thus protecting any downstream components from exposure to a potentially deleterious high voltage. In an example embodiment, the latching circuit may be applied in a pulse width modulation circuit to latch a high voltage side of the transformer for power supply system to ground.

The soft start circuit combined with the automatic variable voltage transient response management system described above may be used in an embodiment in lieu of an extra voltage protection circuit. In such embodiments of the present disclosure, once an over voltage condition is detected, the automatic variable voltage transient response management system may direct an increase in the control circuit resistance, sending an output signal with characteristics falling outside the operating specifications of the soft start circuit, causing a gate within the pulse width modulation circuit to close and latch.

Examples are set forth below with respect to particular aspects of an information handling system for adaptively enhancing transient response for a plurality of output voltages.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions. Specifically, the information handling system 100 may operate on a computing device, on a power adapter operatively connected to a computing device, or on both a computing device and a power adapter operatively connected to a computing device, as described in greater detail below.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the automatic variable voltage transient response management system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and a cursor control device 114, such as a mouse, touchpad, or gesture or touch screen input.

The information handling system 100, as shown in FIG. 1, may also include a power load 118, and a power source 130. The power load 118 may be any electrical component or portion of a circuit that consumes electric power and supports the USB PD standard, including but not limited to several of the components of an information handling system as described herein and understood by a person of skill in the art. The power source 130 may be any electrical component that generates power from alternating current (A/C) or provides power to an information handling system such as via a battery power system. In the present disclosure, this may include an external or internal power supply unit with power controllers including voltage control circuitry. In some examples, the power supply system may be connected to bus 108 such as a power supply controller system. Power load 118 may also be connected to bus 108. It is understood that power may be provided to the information handling system power rails to supply power to processor systems 102, memory 104 and 106, video display systems 110, and other power loads 118.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of code instructions 124 that can be executed to cause the computer system to perform any one or more of the methods or computer based functions disclosed herein. For example, information handling system 100 includes one or more application programs 124, and Basic Input/Output System and Firmware (BIOS/FW) code instructions 124. BIOS/FW code instructions 124 function to initialize information handling system 100 on power up, to launch an operating system, and to manage input and output interactions between the operating system and the other elements of information handling system 100. In a particular embodiment, BIOS/FW code instructions 124 reside in main memory 104, and include machine-executable code that is executed by processor 102 to perform various functions of information handling system 100. Main memory 104 may include, but may not be limited to non-volatile random access memory. In another embodiment, application programs and BIOS/FW code reside in another storage medium of information handling system 100. For example, application programs and BIOS/FW code can reside in static memory 106, drive unit 116, in a ROM (not illustrated) associated with information handling system 100 or other memory. Other options include application programs and BIOS/FW code sourced from remote locations, for example via a hypervisor or other system, that may be associated with various devices of information handling system 100 partially in main memory 104, static memory 106, drive unit 116 or in a storage system (not illustrated) associated with network interface device 120 or any combination thereof. Application programs 124, and BIOS/FW code instructions 124 can each be implemented as single programs, or as separate programs carrying out the various features as described herein. Application program interfaces (APIs) such as Win 32 API may enable application programs 124 to interact or integrate operations with one another.

In an example of the present disclosure, the processor 102 may execute code instructions 124 of the automatic variable voltage transient response management system 132 as disclosed herein, and an API may enable interaction between the application program and device drivers and other aspects of the information handling system and an automatic variable voltage transient response management system 132 thereon. The information handling system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The automatic variable voltage transient response management system 132 and the drive unit 116 may include a computer-readable medium 122 such as a magnetic disk in an example embodiment. The computer-readable medium of the main memory 104, static memory 106, drive unit 116, and automatic variable voltage transient response management system 132 may store one or more sets of code instructions 124, such as software code corresponding to the present disclosure. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The automatic variable voltage transient response management system 132 computer readable medium 122 may also contain space for data storage. The information handling system 100 may also include an automatic variable voltage transient response management system 132 that may be operably connected to the bus 108. The automatic variable voltage transient response management system 132 may perform tasks related to enhancing the transient response of an output signal having a variety of requested output voltages, including but not limited to any one of the four source output voltages supported by the USB standards. In an embodiment, the automatic variable voltage transient response management system 132 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
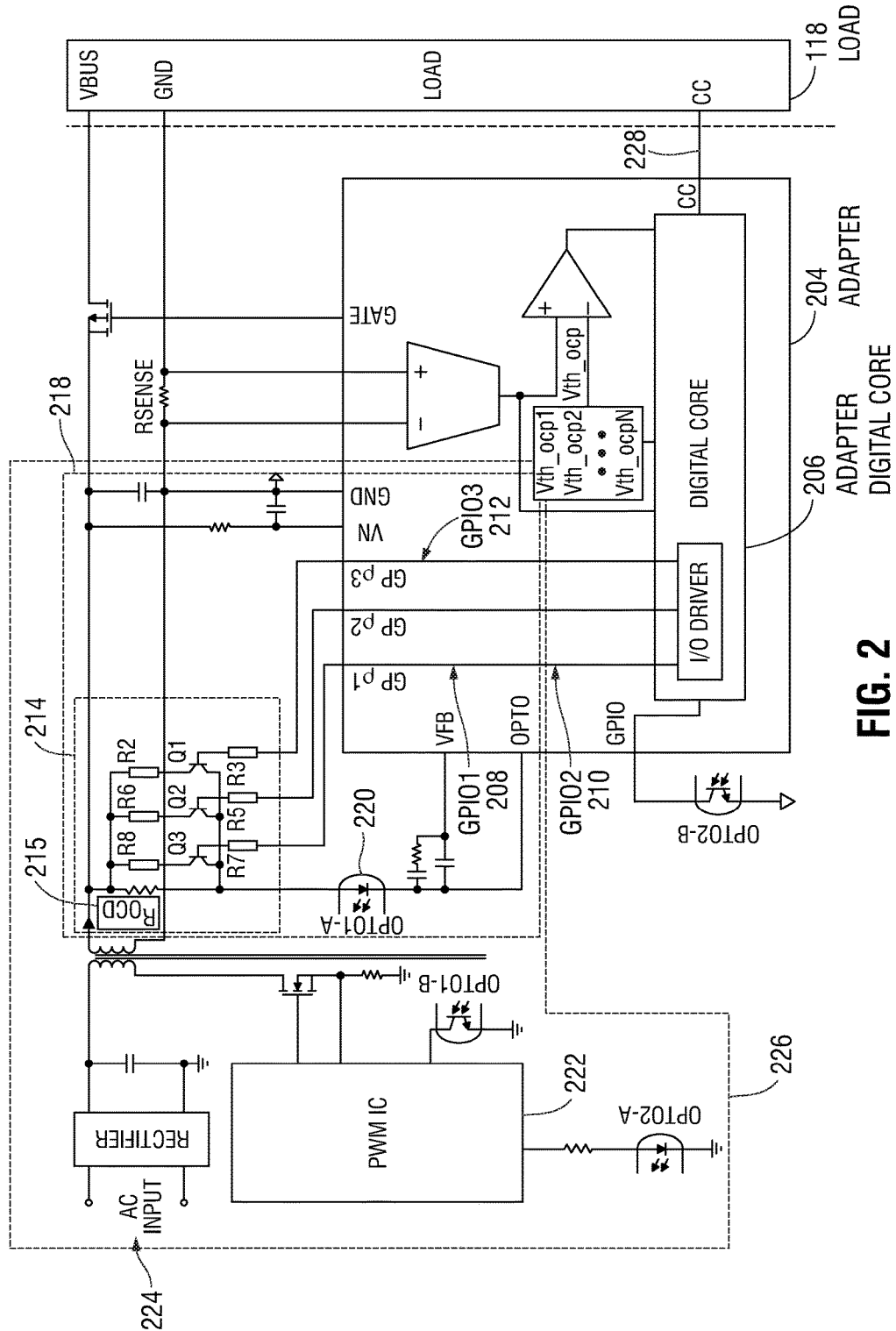
FIG. 2 is a circuit diagram of a feedback unidirectional voltage control circuit according to an embodiment of the present disclosure.

FIG. 2 shows a circuit diagram of a feedback unidirectional voltage control circuit and a power load according to an embodiment of the present disclosure. For example, FIG. 2 may depict a switchable voltage regulator circuit according to embodiments herein. The switchable power regulator circuit may receive alternating current (AC) input voltage 224 and generate a plurality of direct current (DC) output voltages for an information handling system in an example embodiment. The switchable power regulator circuit may include a rectifier operable to receive an input AC voltage 224, a reservoir capacitor, and a pulse-width modulation (PWM) circuit 222 on the high voltage side of a transformer in some embodiments as shown. The transformer may generate one of the plurality of DC output voltages on a low voltage side of the transformer and is operably connected in a feedback loop for an adaptable error amplifier circuit as described further in embodiments herein. The adaptable error amplifier circuit may feedback a control signal to the PWM circuit 222 via an optocoupler such as 220.

As shown in FIG. 2, a power load 118 in an embodiment may be operably connected to a power adapter 204, which includes an adapter digital core 206. The power adapter 204 may be housed within a computing device, such as a tablet, laptop, desktop, or other mobile computing device, or may be housed in a power adapter that may be connected or disconnected from the computing device during battery charging. The adapter digital core 206 of an embodiment may include a processor or controller operating code instructions of the automatic variable voltage transient response management system. The power load 118 may be capable of communicating with the adapter digital core 206 via one or more communications channels 228 in an embodiment, as shown in FIG. 2. For example, in an embodiment, the power load 118 may be capable of communicating a request to the adapter digital core 206 to output one of the USB PD approved output voltages (5V, 9V, 15V, or 20V), or to request that the adapter digital core 206 switch from one of the USB PD approved output voltages (e.g. 5V) to another of the USB PD approved output voltages (e.g. 20V).

The automatic variable voltage transient response management system on the adapter digital core 206 in an embodiment may communicate instructions to one or more transistors via a general purpose in/out (GPIO) lines directing the transistors to allow or disallow the flow of current to a coupled resistor. As an example, and as shown in FIG. 2, the automatic variable voltage transient response management system in an embodiment may instruct transistor $Q_1$, via general purpose in/out lines GPIO3 212, to allow the flow of current to run through coupled resistor $R_2$. As another example, and as shown in FIG. 2, the automatic variable voltage transient response management system in an embodiment may instruct transistor $Q_2$, via general purpose in/out lines GPIO2 210, to allow the flow of current to run through coupled resistor $R_6$. As yet another example, and as shown in FIG. 2, the automatic variable voltage transient response management system in an embodiment may instruct transistor $Q_3$, via general purpose in/out lines GPIO1 208, to allow the flow of current to run through coupled resistor $R_8$. Alternatively, in an embodiment, the automatic variable voltage transient response management system may instruct one or all of the transistors $Q_1$, $Q_2$, or $Q_3$ to not allow current to flow through their paired, controlled resistors $R_2$, $R_6$, or $R_8$, respectively.

Each of the transistors $Q_1$, $Q_2$, or $Q_3$ and coupled resistors $R_2$, $R_6$, or $R_8$ receiving instructions from the automatic variable voltage transient response management system via the general purpose input/output lines 208, 210, 212 in an embodiment may be incorporated within an adaptable resistance control circuit 214. The adaptable resistance control circuit 214 in an embodiment may further include one or more additional low-resistance resistors through which current always flows. For example, the adaptable resistance control circuit 214 in the embodiment described with reference to FIG. 2 also includes current limiting resistors $R_3$, $R_5$, and $R_7$. Each of the low resistance resistors $R_3$, $R_5$, and $R_7$ in an embodiment may be placed in series with one of the transistors $Q_1$, $Q_2$, and $Q_3$ which are each connected to control one of the paired resistors $R_2$, $R_6$, and $R_8$. Each of the current limiting resistors $R_3$, $R_5$, and $R_7$ in an embodiment may also function to provide a connection between each of the transistors $Q_1$, $Q_2$, and $Q_3$ and limit current to the transistor gates via GPIO 208, 210, and 212.

Finally, the adaptable resistance control circuit 214 may include a default control circuit resistor $R_{OCD}$ 215. As shown in FIG. 2, default control circuit resistor $R_{OCD}$ 215 may be placed in parallel with one or more transistor $Q_1$, $Q_2$, or $Q_3$ and paired resistor $R_2$, $R_6$, or $R_8$ combinations. For example, if the automatic variable voltage transient response management system in an embodiment instructed all of the transistors $Q_1$, $Q_2$, and $Q_3$ to not allow current to flow through their paired resistors $R_2$, $R_6$, or $R_8$, respectively, the default control circuit resistor $R_{OCD}$ 215 would effectively be the $R_{OC}$ of the control circuit. The total resistance $R_{OC}$ of the adaptable resistance control circuit 214 in an embodiment where the automatic variable voltage transient response management system instructs transistors $Q_1$, $Q_2$, and $Q_3$ to allow current to flow through their paired transistors $R_2$, $R_6$, or $R_8$ may be calculated using the formula where a, b, and c are a factor of 1 or 0 depending on whether resistors $Q_1$, $Q_2$, or $Q_3$ are turned on (=1) or not (=0) respectively:

$$\frac{1}{R_{OC}} = \frac{1}{R_{OCD}} + (a)\frac{1}{R_2} + (b)\frac{1}{R_6} + (c)\frac{1}{R_8}$$

As another example, if the automatic variable voltage transient response management system in an embodiment instructed transistor $Q_1$, via general purpose in/out lines GPIO3 212, to allow the flow of current to run through coupled resistor $R_2$, the default control circuit resistor $R_{OCD}$ 215 would effectively be placed in parallel with resistor $R_2$ essentially resulting the total resistance $R_{OC}$ of the resistance control circuit 214 to be calculated using the formula:

$$\frac{1}{R_{OC}} = \frac{1}{R_{OCD}} + \frac{1}{R_2}$$

As another example, if the automatic variable voltage transient response management system in an embodiment instructed transistor $Q_2$, via general purpose in/out lines GPIO2 210, to allow the flow of current to run through coupled resistor $R_6$, the default control circuit resistor $R_{OCD}$ 215 would effectively be placed in parallel with $R_6$. In such an embodiment, the total resistance $R_{OC}$ of the adaptable resistance control circuit 214 may be calculated using the formula:

$$\frac{1}{R_{OC}} = \frac{1}{R_{OCD}} + \frac{1}{R_6}$$

As another example, if the automatic variable voltage transient response management system in an embodiment instructed transistor $Q_3$, via general purpose in/out lines GPIO1 208, to allow the flow of current to run through coupled resistor $R_8$, the default control circuit resistor $R_{OCD}$ 215 would effectively be placed in parallel $R_8$. In such an embodiment, the total resistance $R_{OC}$ of the adaptable resistance control circuit 214 may be calculated using the formula:

$$\frac{1}{R_{OC}} = \frac{1}{R_{OCD}} + \frac{1}{R_8}$$

These are just three examples of possible combinations of resistances that can be generated by the transistors and resistors shown within the adaptable resistance control circuit 214 in FIG. 2. Adapter digital core 206 may utilize an I/O driver to activate any combination of GPIO lines 208, 210, or 212 to activate any combination of $Q_1$, $Q_2$, or $Q_3$ including none of these transistors or all of these transistors to provide several combinations of resistances through the adaptable resistance control circuit 214. As described in greater detail below, in the current embodiment there are a total of eight possible combinations of resistances that can be generated by the transistors and resistors shown within the resistance control circuit 214 in FIG. 2. In addition, as described above, there can be any number of resistors through which current always flows, and any number of pairs of transistors and resistors through which current may optionally flow within the adaptable resistance control circuit 214. Further, it is understood that resistors may be placed in series with each other or $R_{OCD}$ 215 and activated via GPIO lines 208, 210, 212 or other GPIO lines to create additional options to activate resistance levels to set $R_{OC}$. As such, embodiments of the present disclosure may include any number of possible combinations of resistances that can be generated within the resistance control circuit 214.

The total resistance $R_{OC}$ in an embodiment may be varied by placing one or more resistors in parallel with the default control circuit resistor $R_{OCD}$ 215. For example, the automatic variable voltage transient response management system may provide a positive current via GPIO1, GPIO2, or GPIO3 to transistors $Q_3$, $Q_2$, or $Q_1$, respectively, thereby activating the transistors and allowing current to flow to the paired resistors $R_8$, $R_6$, or $R_2$, respectively.

More specifically, the total resistance $R_{OC}$ of the adaptable resistance control circuit 214 in an embodiment may decrease as the current flows through more of the parallel controlled resistors $R_2$, $R_6$, or $R_8$ (placed in parallel with the default control circuit resistance $R_{OC}$) in the presently-described embodiment.

Although FIG. 2 depicts three paired resistors placed in series with the transistors $Q_1$, $Q_2$, and $Q_3$, the adaptive resistance control circuit 214 may have any number of transistors and paired resistors, and be activated by one or more transistors placed in series with the resistors. Further combinations of transistors activate by GPIO to increase or decrease $R_{OCD}$ levels and set an effective $R_{OC}$ to provide control over the transition of the EA circuit output signal gain. As described, EA circuit measured difference between the reference signal and the output signal of the PWM circuit is compensated by the alteration of the gain of the output signal in order to optimize a crossover frequency which is a setting relative to the selected output power desired. By optimizing the crossover frequency of the output signal with gain alteration due to alteration of $R_{OC}$ levels via the resistor control circuit as determined by the adapter digital core 206 determining the required voltage output level, the EA circuit may enhance the transient response of each desired output signal voltage by providing sufficient response with limited transient overshoot tailored to the selected output voltage level. The adapter digital core 206, may signal transistors $Q_1$, $Q_2$, or $Q_3$ to activate to reduce the $R_{OCD}$ level to an effective $R_{OC}$ value to optimize the 0 dB crossover frequency for the selected output voltage level. The resistance due to activation of each of the paired transistors in an embodiment may vary according to design needs for the expected selection of output voltages indicated to the power adapter digital core 206 via a control channel 228 according to embodiments herein.

During the design phase of the adaptable EA circuit and control circuit, the total control circuit resistance $R_{OC}$ associated with each of these combinations may be stored in an embodiment in a lookup table, and each combination (or each resultant $R_{OC}$) may be associated with one of a variety of output voltages, including but not limited to one of the four available USB PD output voltages, the transient response of which that combination (or resultant $R_{OC}$) may enhance. The digital core of the power adapter in an embodiment may also include a memory for storing the lookup table.

The resistance control circuit 214 may be included within an adaptive error amplifier circuit 218. As described above, the use of an error amplifier circuit (EA circuit) in a feedback unidirectional voltage control circuit is one method for correcting voltage transients caused by changes in power supply voltage. The adaptive EA circuit 218 shown in FIG. 2 may include the resistance control circuit 214, having a total resistance $R_{OC}$, an octocoupler 220, and one or more additional resistors and/or capacitors, as described in greater detail below. The adaptive EA circuit 218 in an embodiment may generate a reference voltage that it can compare against received output voltages to determine whether the output voltage is within preferred operating parameters. The total resistance of the adaptive EA circuit 218 in an embodiment shown in FIG. 2 may thus have a total resistance equivalent to the sum of the resistance of each of the additional resistors, and the total control circuit resistance $R_{OC}$. The adaptive error amplifier circuit 218 in an embodiment may differ the total control circuit resistance $R_{OC}$, and thus the total resistance of the adaptive error amplifier circuit 218 is variable during operation of the adaptive error amplifier circuit 218. In traditional EA circuits, the number of resistors through which current may flow is preset and static. As a consequence, the total resistance of the traditional EA circuit is not varied after the design phase of the circuit, and during the operation of the traditional EA circuit. In some embodiments, the adaptive error amplifying circuit comprises a type II or type III frequency compensator.

As also described above, a feedback unidirectional voltage control circuit 226 may further include a pulse width modulation integrated circuit (PWM IC) 222. The PWM IC 222 in an embodiment may operate to receive an input voltage from an outside power source (here, the AC input 224) and alter the input signal by modulating the pulse width. The PWM IC 222 in an embodiment may thus generate an output signal, which is then fed back into the adaptable EA circuit 218 via the feedback unidirectional voltage control circuit 226. As described above, the adaptable EA circuit 218 in an embodiment may generate a reference voltage that it can compare against the output signal it received from the PWM IC 222 via the feedback loop in order to determine whether the output signal is within preferred operating parameters.

As also described above, if the adaptable EA circuit 218 in an embodiment detects a measured difference between the reference voltage and the output voltage of the PWM IC circuit 222, the adaptable EA circuit 218 may compensate for this difference by altering the gain of the output signal in order to optimize its crossover frequency, as will be described in greater detail below. Since the gain of the output signal is a function of the total resistance of a traditional EA circuit, and, as described above, the corresponding total resistance circuit may not vary after the design phase of the circuit, or during the operation, the traditional EA circuit is limited to optimize the output signal for a single, preset output voltage. For example, a traditional EA circuit may be capable of optimizing the crossover frequency of a 5V output signal, but the same traditional EA circuit would not be capable of optimizing the crossover frequency of a 20V output signal. In fact, as described above, the traditional EA circuit designed for a 5V output voltage may actually force a 20V output voltage to become unstable and unusable.

In an embodiment, the power load 118 in an embodiment may be capable of communicating a request to the adapter digital core 206 to output one of a variety of output voltages, including but not limited to one of the USB PD approved output voltages (5V, 9V, 15V, or 20V), or to request that the adapter digital core 206 switch from one of the USB PD approved output voltages (e.g. 5V) to another of the USB PD approved output voltages (e.g. 20V). As also described above, the adaptive error amplifier circuit 218 with the adaptive resistance control circuit 214 of the embodiment described with reference to FIG. 2 may modify the total control circuit resistance $R_{OC}$, and thus the total gain of the adaptive error amplifier circuit 218 is variable during operation of the adaptive error amplifier circuit 218. As a consequence, the adaptive error amplifier circuit 218 may be capable of altering the gain in a number of ways, and thus, optimizing the output signal for a plurality of output voltages potentially requested by a load 118.

Upon receiving the request to switch from one voltage to another, the automatic variable voltage transient response management system in an embodiment may access the lookup table stored in memory of the digital core, and determine which of the eight combinations of resistors the control circuit should employ in order to enhance the transient response of an output signal having the desired output voltage, as described in greater detail below. As a specific example, the adaptive error amplifier circuit 218, by altering the total resistance of the adaptive resistance control circuit $R_{OC}$ 214, may be capable of optimizing the crossover frequency for an output signal having a voltage of 5V, 9V, 15V, and/or 20V. Further, the automatic variable voltage transient response management system in an embodiment may be capable of directing a change in the total control circuit resistance $R_{OC}$ during operation of the adaptable EA circuit 218. As a consequence, upon receipt of a request from the load 118 to change the output voltage, the automatic variable voltage transient response management system may operate to not only provide a near instantaneous change to the newly requested voltage, but may also immediately shift the operation of the adaptable EA circuit 218 in order to optimize the crossover frequency of the newly requested voltage.

FIG. 3 is a graphical diagram illustrating a lookup table associating various total control circuit resistances with various voltage outputs according to an embodiment of the present disclosure. As described above, during the design phase of the adaptable EA circuit and control circuit in an embodiment, the total control circuit resistance $R_{OC}$ associated with each of these combinations may be stored in a lookup table within the memory of the power adapter digital core, and each combination (or each resultant $R_{OC}$) may be associated with of a variety of output voltages, including but not limited to one of the four available USB PD output voltages, the transient response of which that combination (or resultant $R_{OC}$) may enhance. For example, as shown in FIG. 3, a lookup table 302 in an embodiment may list in rows the eight combinations of resistors located within the resistance control circuit described above with reference to FIG. 2.

More specifically, the resistance control circuit in an embodiment may include three resistors through which current may flow (e.g. $R_3$, $R_5$, and $R_7$) to activate transistors $Q_1$, $Q_2$, or $Q_3$ respectively, but as described above, a total control circuit resistance may occur when no signal current flows through these three resistors to activate the transistors and the default control circuit resistor $R_{OCD}$ is the effective circuit resistance $R_{OC}$. The base total control resistance may also be associated with a latch condition to provide maximum resistance for $R_{OC}$ to provide some abnormal condition protection, and activation of only $R_{OCD}$ in the lookup table 302, as shown in the second row of FIG. 3, and may be calculated as:

$$R_{OC} = \left(\frac{1}{R_{OCD}}\right)^{-1}$$

Additionally, and as described above, the automatic variable voltage transient response management system may direct one or more transistors to allow current to flow through an additional resistor $R_2$, $R_6$, or $R_8$. For example, the automatic variable voltage transient response management system may direct one or more transistors $Q_1$, $Q_2$, or $Q_3$ to allow current to flow through one or more of the additional resistors (e.g. $R_2$, $R_6$, and $R_8$). In such a scenario, the additional resistors $R_2$, $R_6$, and $R_8$ through which the automatic variable voltage transient response management system triggers current to flow establish a parallel resistance with the default control circuit resistor $R_{OCD}$, causing the total resistance of the control circuit $R_{OC}$ to decrease as the automatic variable voltage transient response management system directs current to flow through each additional resistor (e.g. $R_2$, $R_6$, and $R_8$) according to an embodiment. Other resistance control circuits are contemplated which may alter $R_{OCD}$ by increasing or decreasing $R_{OC}$ according to other embodiments.

The lookup table 302, as shown in FIG. 3 may include a column for the default total control circuit resistance $R_{OCD}$ and a column for each of the additional resistors $R_2$, $R_6$, and $R_8$ through which the automatic variable voltage transient response management system may allow current to flow. Each row of the lookup table 302 may indicate the number of each of those resistances included in a given combination of resistors in an active resistance control circuit. In addition, for each of the possible combinations, the total resistance control circuit $R_{OC}$ may be calculated and stored in a fourth column of the lookup table 302. For example, with reference to the resistance control circuit depicted in the embodiment described in FIG. 2, the total resistance of the control circuit $R_{OC}$ may be stored in the fourth column of the lookup table 302 and may be associated with one of eight possible combinations of resistors, including: (1) $R_{OCD}$, as shown in the second row of the lookup table 302; (2) $R_{OCD}//R_8$, as shown in the third row; (3) $R_{OCD}//R_6$, as shown in the fourth row; (4) $R_{OCD}//R_2$, as shown in the fifth row; (5) $R_{OCD}//R_8//R_6$, as shown in the sixth row; (6) $R_{OCD}//R_8//R_2$, as shown in the seventh row; (7) $R_{OCD}//R_6//R_2$, as shown in the eight row; and (8) $R_{OCD}//R_8//R_6//R_2$, as shown in the ninth row. The lookup table will further indicate to the adapter digital core which GPIO signals to activate that correspond to activating the indicated resistor such as $R_2$, $R_6$, or $R_8$ via a control signal to $Q_1$, $Q_2$, or $Q_3$.

More specifically, the total resistance of the control circuit $R_{OC}$ stored in the second row of the fourth column of the lookup table 302 may be equivalent to the maximum total control circuit resistance:

$$R_{OC} = \left(\frac{1}{R_{OCD}}\right)^{-1}$$

The total resistance of the control circuit $R_{OC}$ stored in the third row of the fourth column of the lookup table 302 may be equivalent to the total control circuit resistance resulting from current flowing through the default control circuit resistor $R_{OCD}$ and resistor $R_8$, and may be calculated as:

$$R_{OC} = \left(\frac{1}{R_{OCD}} + \frac{1}{R_8}\right)^{-1}$$

The total resistance of the control circuit $R_{OC}$ stored in the fourth row of the fourth column of the lookup table 302 may be equivalent to the total control circuit resistance resulting from current flowing through the default control circuit resistor $R_{OCD}$ and resistor $R_6$, and may be calculated as:

$$R_{OC} = \left(\frac{1}{R_{OCD}} + \frac{1}{R_6}\right)^{-1}$$

The total resistance of the control circuit $R_{OC}$ stored in the fifth row of the fourth column of the lookup table 302 may be equivalent to the total control circuit resistance resulting from current flowing through the default control circuit resistor $R_{OCD}$ and resistor $R_2$, and may be calculated as:

$$R_{OC} = \left(\frac{1}{R_{OCD}} + \frac{1}{R_2}\right)^{-1}$$

The total resistance of the control circuit $R_{OC}$ stored in the sixth row of the fourth column of the lookup table 302 may be equivalent to the total control circuit resistance resulting from current flowing through the default control circuit resistor $R_{OCD}$ and resistors $R_6$ and $R_8$, and may be calculated as:

$$R_{OC} = \left(\frac{1}{R_{OCD}} + \frac{1}{R_6} + \frac{1}{R_8}\right)^{-1}$$

The total resistance of the control circuit $R_{OC}$ stored in the seventh row of the fourth column of the lookup table 302 may be equivalent to the total control circuit resistance resulting from current flowing through the default control circuit resistor $R_{OCD}$ and resistors $R_2$ and $R_8$, and may be calculated as:

$$R_{OC} = \left(\frac{1}{R_{OCD}} + \frac{1}{R_2} + \frac{1}{R_8}\right)^{-1}$$

The total resistance of the control circuit $R_{OC}$ stored in the eighth row of the fourth column of the lookup table 302 may be equivalent to the total control circuit resistance resulting from current flowing through the default control circuit resistor $R_{OCD}$ and resistors $R_2$ and $R_6$, and may be calculated as:

$$R_{OC} = \left(\frac{1}{R_{OCD}} + \frac{1}{R_2} + \frac{1}{R_6}\right)^{-1}$$

The total resistance of the control circuit $R_{OC}$ stored in the eighth row of the fourth column of the lookup table 302 may be equivalent to the total control circuit resistance resulting from current flowing through the default control circuit resistor $R_{OCD}$ and resistors $R_2$, $R_6$ and $R_8$, and may be calculated as:

$$R_{OC} = \left(\frac{1}{R_{OCD}} + \frac{1}{R_2} + \frac{1}{R_6} + \frac{1}{R_8}\right)^{-1}$$

As shown in FIG. 3, each of the eight possible combinations of resistors according to an embodiment, and each of the total resistances $R_{OC}$ for a control circuit employing the possible combinations may be associated with an output voltage in an embodiment. As described above, without a resistance control circuit an EA circuit may alter the gain of several different output voltages in the same way, which may actually force the signal associated with some of the selection of voltages to become unstable and unusable, rather than stabilizing it. However, the adaptable EA circuit of the present embodiments that includes a resistance control circuit, such as one whose resistance is described by the lookup table 302 shown in FIG. 3, may apply a customized gain to an output signal based on which output voltage is desired at a given time. The automatic variable voltage transient response management system in an embodiment may customize the gain applied to the output signal by adjusting the total control circuit resistance $R_{OC}$. The total control circuit resistance $R_{OC}$ options are selected based on the transfer function feedback required for the error amplifier feedback circuit to modify the phase gain margin for the desired output voltage. The $R_{OC}$ options are selected to be balanced between overshoot ripple and slow voltage response time when a desired voltage level, such as the PD voltage levels, are switched to or otherwise selected. In order to do so, each of the possible combinations of resistors available for use in the control circuit may be associated with one or more output voltages, and each of the combinations of resistors may be associated with the output voltage whose crossover frequency that combination of resistors is designed to optimize.

For example, the 5V PD voltage output may be associated with the total control circuit resistance generated by directing the flow of current through all of the resistors $R_{OCD}$, $R_2$, $R_6$, and $R_8$, as shown in row seven of the fifth column of the lookup table 302, or with the total control circuit resistance generated by directing the flow of current through the resistors $R_{OCD}$, $R_2$, and $R_6$, as shown in the sixth row of the fifth column of the lookup table 302 in FIG. 3. As another example, the 9V PD voltage output may be associated with the total control circuit resistance generated by directing the flow of current through the resistors $R_{OCD}$, $R_2$, and $R_8$, as shown in row sixth of the fifth column of the lookup table 302, or with the total control circuit resistance generated by directing the flow of current through the resistors $R_{OCD}$, $R_6$, and $R_8$, as shown in the fifth row of the fifth column of the lookup table 302 in FIG. 3.

As another example, the 15V PD voltage output may be associated with the total control circuit resistance generated by directing the flow of current through the resistors $R_{OCD}$, and $R_2$, as shown in row four of the fifth column of the lookup table 302, or with the total control circuit resistance generated by directing the flow of current through the resistors $R_{OCD}$, and $R_6$, as shown in the third row of the fifth column of the lookup table 302 in FIG. 3. As another example, the 20V PD voltage output may be associated with the total control circuit resistance generated by directing the flow of current through the resistors $R_{OCD}$, and $R_8$, as shown in row second of the fifth column of the lookup table 302 in FIG. 3. As yet another example, a latch condition may be associated with the total control circuit resistance generated by directing the flow of current through only the resistors $R_{OCD}$ as shown in the first row of the fifth column of the lookup table 302 in FIG. 3.

As described above, in an embodiment, the power load may be capable of communicating a request to the adapter digital core to output one of a variety of output voltages, including but not limited to one of the USB PD approved output voltages (5V, 9V, 15V, or 20V), or to request that the adapter digital core switch from one of the USB PD approved output voltages (e.g. 5V) to another of the USB PD approved output voltages (e.g. 20V). As also described above, upon receiving the request to switch from one voltage to another, the automatic variable voltage transient response management system in an embodiment may access the lookup table stored in memory of the digital core, and determine which of the eight combinations of resistors the control circuit should employ in order to enhance the transient response of an output signal having the desired output voltage. The automatic variable voltage transient response management system may then instruct one or more transistors to allow current to only flow through the default resistor $R_{OCD}$ and whichever resistors are included in the combination identified in the lookup table 302 as being associated with the desired output voltage.

For example, in response to receiving a request to switch from a 5V signal to a 20V signal, the automatic variable voltage transient response management system in an embodiment may access the lookup table 302 as shown in FIG. 3, and may identify in the second column that the resistors $R_{OCD}$, and $R_8$ are associated with a 20V output signal. The automatic variable voltage transient response management system may then not instruct transistors $Q_1$ (paired with resistor $R_2$) $Q_2$ (paired with resistor $R_6$) to allow current to flow through resistors $R_2$ and $R_6$, and may instruct transistor $Q_3$ (paired with resistor $R_8$) to allow current to flow through resistor $R_8$. In such a way, upon receipt of a request from the load to change the output voltage, the automatic variable voltage transient response management system may operate to not only provide a near instantaneous change to the requested voltage, but may also immediately shift the operation of the adaptable EA circuit in order to optimize the crossover frequency of the requested voltage.

Figure 4A:
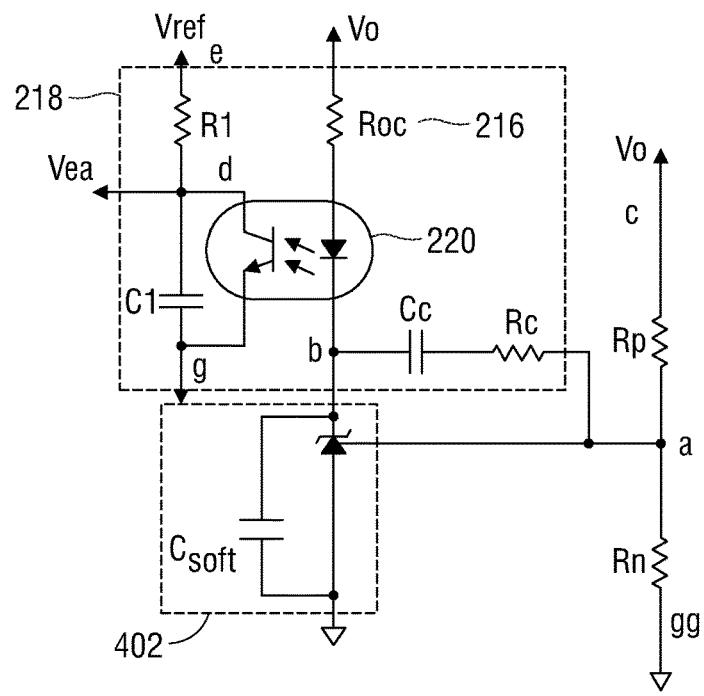
FIG. 4A is a circuit diagram of an adaptive error amplifying circuit according to an embodiment of the present disclosure.
Figure 4B:
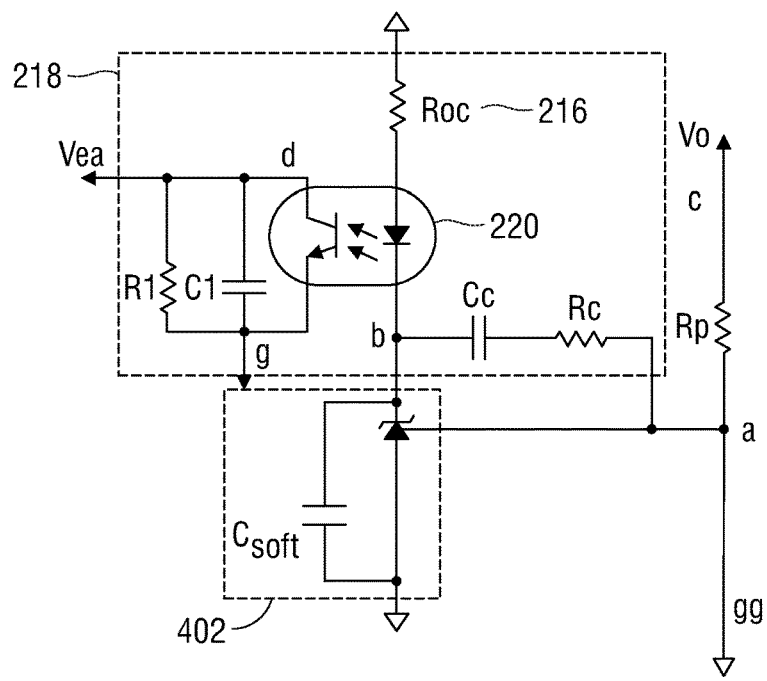
FIG. 4B is a circuit diagram of an adaptive error amplifying circuit according to an embodiment of the present disclosure.

FIGS. 4A and 4B are circuit diagrams of adaptive error amplifying circuits including total control circuit resistances according to example embodiments of the present disclosure. As described above, the use of an error amplifier circuit (EA circuit) in a feedback unidirectional voltage control circuit is one method for correcting voltage transients caused by changes in power supply voltage. FIG. 4A and FIG. 4B show two potential embodiments for a feedback loop design for an adaptive error amplifying circuit for feedback to an oscillator to improve response of a power supply unit with switching capability. The adaptive EA circuit 218 shown in FIGS. 4A and 4B may include the resistance control circuit (not shown), having a total effective resistance $R_{OC}$ 216, an octocoupler 220, and one or more additional resistors and/or capacitors, as described in greater detail below. Optocoupler 220 provides for unidirectional feedback from the error amplifier to the oscillator on the other side of a transformer in the power supply to allow for feedback across the high voltage isolation barrier of the transformer. The adaptive EA circuit 218 may generate a reference voltage $V_{ref}$ that it can compare against received output voltages $V_O$ to yield the generated $V_{ea}$ to determine whether the output voltage $V_O$ is within preferred operating parameters. The total resistance of the adaptive EA circuit 218 shown in FIGS. 4A and 4B may thus have a total resistance equivalent $R_{OC}$ 216 to the modified resistance of each of the additional resistors as described above in combination with the fixed resistance $R_{OCD}$. As described above, the adaptive error amplifier circuit 218 as shown in FIGS. 4A and 4B in an embodiment may differ from a traditional error amplifier circuit in that the total control circuit resistance $R_{OC}$ 216, and thus the total resistance of the adaptive error amplifier circuit 218 is variable during operation of the adaptive error amplifier circuit 218.

As also shown in FIGS. 4A and 4B, the adaptable EA circuit 218 may also be operably connected to a soft start circuit 402, including a capacitor $C_{SOFT}$. Also shown as part of the soft start circuit 402 is a parallel shunt regulator circuit such as a TL431 circuit which may, in combination with a selected total control circuit resistance $R_{OC}$ 216, provide for a smooth rise in output voltage and limiting overshoot voltage at the voltage output and transformer saturation upon start up. The capacitor $C_{SOFT}$ may act to limit the over shoot of voltage while the total control circuit resistance $R_{OC}$ 216 circuit may also set gain for the feedback to determine crossover frequency as described and to provide a linear rise of voltage or current. The dynamic alteration of the control circuit resistance during operation of the adaptable EA circuit, in combination with a soft start circuit in embodiments of the present disclosure also provides a solution to voltage overshooting as a result of high inrush of electrical current at start up. As power is first applied to a circuit, the capacitors must be charged from zero to their final values, and the inductors, transformers, and other active components must move from inactive to active states. These changes cause the input impedance of the circuit to appear as being very low, thereby causing large inrush currents of up to 7-10 times higher than running current to flow. This occurs prior to establishment of the feedback loop operating to regulate the transient response of the output signal. High currents and current peaks associated with the inrush currents described above lead to increased stress and wear and tear on physical circuitry, leading to shorter life cycles for physical components.

As shown in FIGS. 4A and 4B, the adaptable EA circuit 218 may be operably connected to a soft start circuit 402 to eliminate problems associated with the inrush current at startup and to limit voltage overshoots. The soft start circuit 402 in an embodiment may operate by increasing the duty cycle at start up from zero to the default DC maximum at turn on, which may cause the current and output voltage to rise in an orderly manner and allow time for the adaptable EA circuit to regulate the output signal. Causing the current and output voltage to rise in an orderly manner in an embodiment may reduce stress on physical components such as MOSFETs, clamp circuits, and output diodes, resulting in longer life cycles of those components. Thus, the combination of the soft start circuit induced linear rise of current and voltage with the adaptable EA circuit induced optimization of output signal crossover frequency in an embodiment may provide a solution to the problem of high inrush currents and voltage overshoots at startup.

Figure 5:
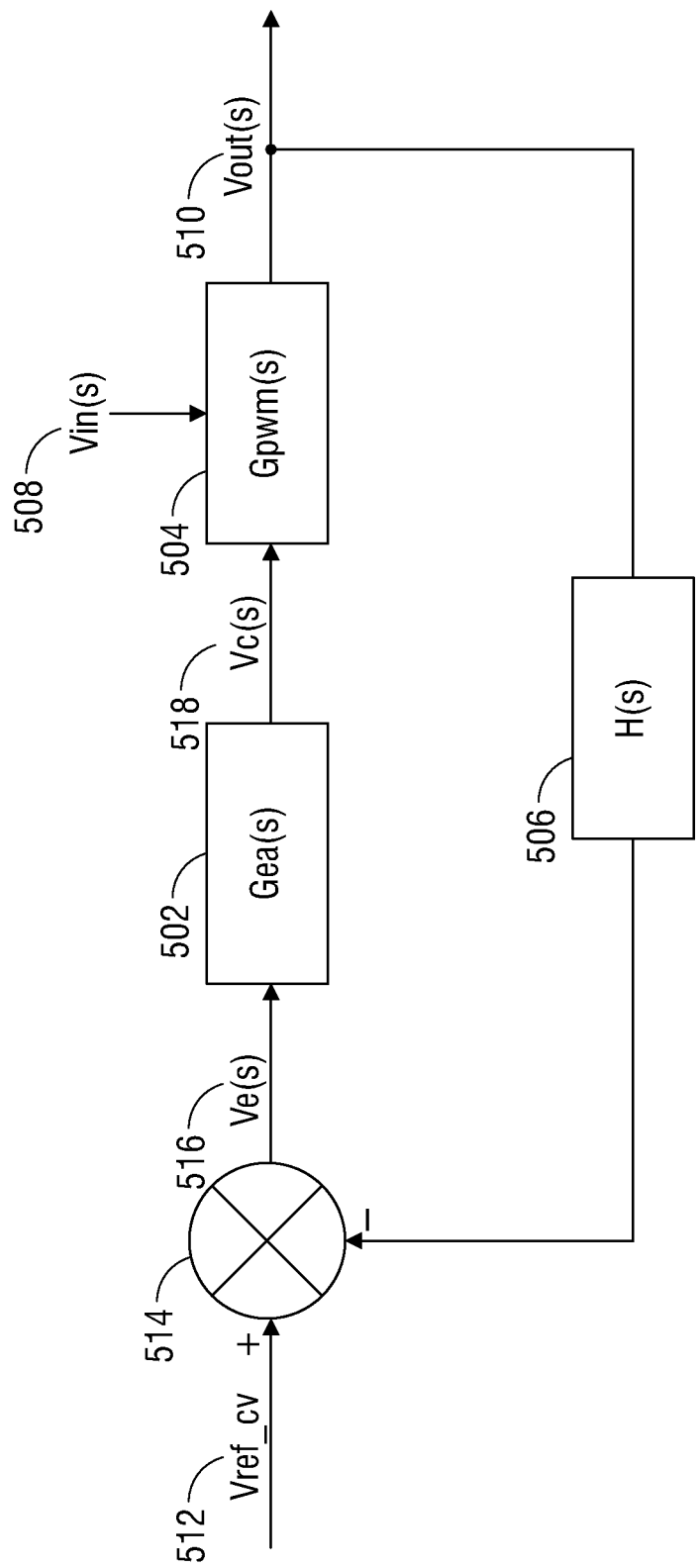
FIG. 5 is a block diagram illustrating a feedback unidirectional voltage control circuit transfer function according to an embodiment of the present disclosure.

FIG. 5 shows a block diagram illustrating a feedback unidirectional voltage control circuit transfer function corresponding to the circuit diagrams described above according to an embodiment of the present disclosure. As described above, the use of an error amplifier circuit (EA circuit) in a feedback unidirectional voltage control circuit is one method for correcting voltage transients caused by changes in power supply voltage selected. Voltage and current may be measured between two preset points within the adaptive error amplifier circuits 218 depicted in FIGS. 4A and 4B. For example, the voltage $\hat{v}_{ba}$, and current $\hat{\imath}_{ab}$ between points a and b may be measured, the voltage $\hat{v}_{dg}$, and current $\hat{\imath}_{dg}$ between points d and g may be measured, and the current $\hat{\imath}_{cb}$ between points c and b may be measured. In addition, the voltage $\hat{v}_O$ may be measured as it leaves the control circuit resistor $R_{OC}$ and heads toward the PWM IC, and as it leaves the post signal compensation resistor $R_p$ and heads toward the power load.

The block diagram of FIG. 5 illustrates the gain of an EA circuit $G_{ea}(s)$ 502, gain of a PWM IC $G_{pwm}(s)$ 504, and the feedback loop transfer function H(s) 506. As described above, the adaptable EA circuit may be placed with the PWM IC in a feedback unidirectional voltage control circuit. The full transfer function for the feedback unidirectional voltage control circuit shown in FIG. 5 in an embodiment may be described by the equation $$T(s) = G_{ea}(s) * G_{pwm}(s) * H(s)$$

In an embodiment, where the output signal does not loop back to the adaptable EA circuit gain 502, otherwise known as an open loop, the open loop transfer function H(s) 506 may be roughly equivalent to one.

As also described above, in such methods, a sampled output voltage may be fed back and compared to a stable reference voltage otherwise known as a closed loop, and any measured difference between the two may generate a compensating error voltage that tends to move the output voltage towards the design specification. For example, in an embodiment, the PWM IC may receive an input voltage $v_{in}$ and generate a sampled output voltage $v_{out}$. FIG. 5 depicts the Laplace transforms of $v_{in}$ and $v_{out}$ as $V_{in}(s)$ 508 and $V_{out}(s)$ 510, respectively. The adaptable EA circuit in an embodiment may generate a reference voltage $v_{ref\_cv}$, and compare that reference voltage to the sampled output voltage $v_{out}$. FIG. 5 depicts the Laplace transforms of $v_{ref\_cv}$ as $V_{ref\_cv}(s)$ 512 and compares $V_{ref\_cv}(S)$ 512 to $V_{out}(s)$ 510 at the comparison step depicted in FIG. 5 as 514 in order to generate an error signal Laplace transform of $V_e(s)$ 516. The signal associated with the error signal in an embodiment may be fed back into the adaptive EA circuit, as depicted in FIG. 5 by $V_e(s)$ being fed into the transfer function $G_{ea}(s)$ 502. The adaptive EA circuit may then adjust the gain of the input error signal in order to generate a corrected signal having a voltage $v_C$, associated with the Laplace transform $V_C(s)$ 518 as shown in FIG. 5.

The gain for the adaptive EA circuit may be represented by:

$$G_{ea}(s) = \frac{\hat{V}_{ba}(s)}{\hat{V}_0(s)} \times \frac{\hat{\imath}_{ab}(s)}{\hat{V}_{ba}(s)} \times \frac{\hat{\imath}_{dg}(s)}{\hat{\imath}_{cb}(s)} \times \frac{\hat{V}_{dg}(s)}{\hat{\imath}_{dg}(s)}$$

where $\hat{V}_{ba}(s)$ represents the Laplace transform for the voltage between points a and b as shown in FIGS. 4A and 4B, $\hat{V}_0(s)$ represents the Laplace transform for the output voltage, $\hat{\imath}_{ab}(s)$ represents the Laplace transform for the current between points a and b as shown in FIGS. 4A and 4B, $\hat{\imath}_{cb}(s)$ represents the Laplace transform for the current between points c and b as shown in FIGS. 4A and 4B, $\hat{\imath}_{dg}(s)$ represents the Laplace transform for the current between points d and g as shown in FIGS. 4A and 4B, and $\hat{V}_{dg}(s)$ represents the Laplace transform for the voltage between points d and g as shown in FIGS. 4A and 4B. The transfer function for the adaptive EA circuit may also be rewritten as:

$$G_{ea}(s) = \frac{1 + (R_C \times C_C \times s)}{R_p \times C_C \times s} \times \frac{1}{R_{OC}} \times CTR \times \frac{R_1}{1 + (R_1 \times C_1 \times s)}$$

where the resistances $R_C$, $R_p$, $R_1$, and $R_{OC}$ refer to the resistances of the resistors shown in FIGS. 4A and 4B, the capacitances $C_1$, and $C_C$ refer to the capacitors shown in FIGS. 4A and 4B, and CTR is the current transfer ratio of the octocoupler shown in FIGS. 4A and 4B.

The open loop transfer function of the feedback unidirectional voltage control circuit may be represented by:

$$T(s) = G_{pwm}(s) \times \frac{CTR \times R_1}{R_{OC} \times R_p \times C_C \times s} \times \frac{1 + (R_C \times C_C \times s)}{1 + (R_1 \times C_1 \times s)}$$

which may generate two poles represented by the equations:

$$\frac{R_{OC} \times R_p \times C_C}{2\pi \times CTR \times R_1}$$

and $$\frac{1}{2\pi \times R_1 \times C_1}$$

The open loop transfer function may also generate a zero represented by the equation:

$$\frac{1}{2\pi \times R_C \times C_C}$$

As can be seen by the equations above, the open loop transfer function T(s) is dependent upon the variables CTR, $C_1$, $C_C$ $R_C$, $R_p$, $R_1$, and $R_{OC}$. Assuming the variables CTR, $C_1$, $C_C$ $R_C$, $R_p$, and $R_1$ remain fixed following the design phase of the adjustable EA circuit, as they would in a traditional EA circuit, the open loop transfer function T(s) may be altered by closing the loop and changing the value of $R_{OC}$. As a result, the $R_{OC}$ value acts to define the gain and a pole-zero position. The $R_{OC}$ value can therefore ensure the right gain at a crossover frequency for a voltage and enough bias in a light-load condition to enhance performance of a power supply unit.

Figure 6:
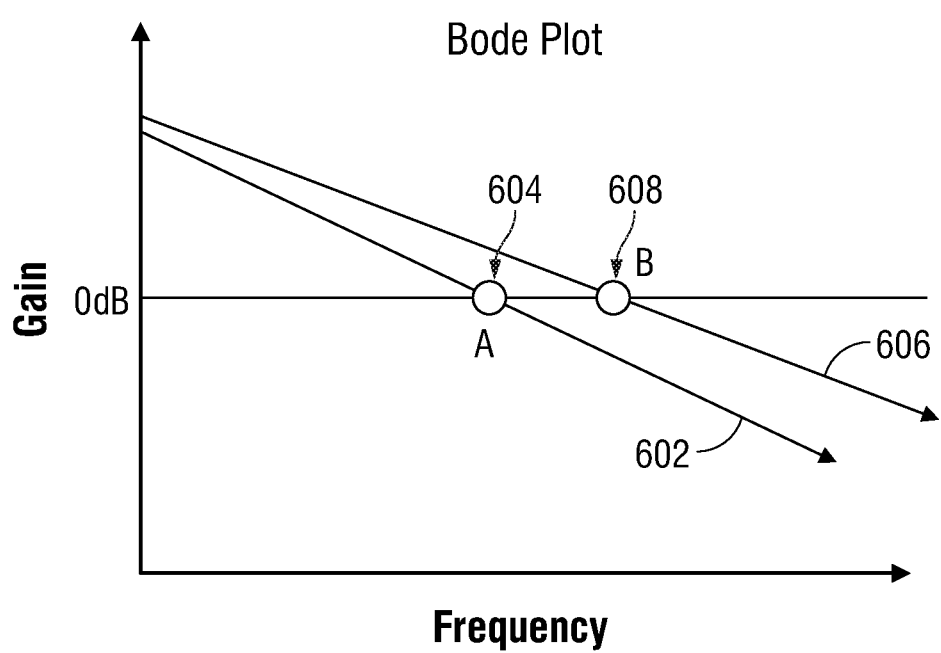
FIG. 6 is a bode plot of an open and closed loop transfer function of an adaptable EA circuit according to an embodiment of the present disclosure.

FIG. 6 is a bode plot of an open and closed loop transfer function of an adaptable EA circuit having an incorporated control circuit according to an embodiment of the present disclosure. As shown in FIG. 6, line 602 plots the gain as a function of frequency of the open loop transfer function described above. The open loop transfer function line 602 shown in FIG. 6 indicates a crossover frequency (point at which the gain of the function crosses from positive to negative) at point A 604. As also shown in FIG. 6, line 606 plots the gain as a function of frequency of the closed loop transfer function having a crossover frequency at point B 608. The open loop transfer function line illustrates how the gain of the output signal varies with frequency when the adaptable EA circuit does not alter the signal, while the closed loop transfer function line illustrates how the gain of the output signal varies with frequency after the adaptable EA circuit has corrected or altered the signal.

As shown in FIG. 6, the crossover frequency A 604 of the open loop transfer function 602 may occur at a lower frequency than the crossover frequency B 608 of the closed loop transfer function 606. In other words, the Bode plot of the open loop transfer function and closed loop transfer function indicates the adaptable EA circuit operates to increase the crossover frequency from point A 604 to point B 608. This is only one example of a way in which the adaptable EA circuit may alter the output signal. In other embodiments, the adaptable EA circuit may decrease the crossover frequency of an open loop transfer function.

Figure 7:
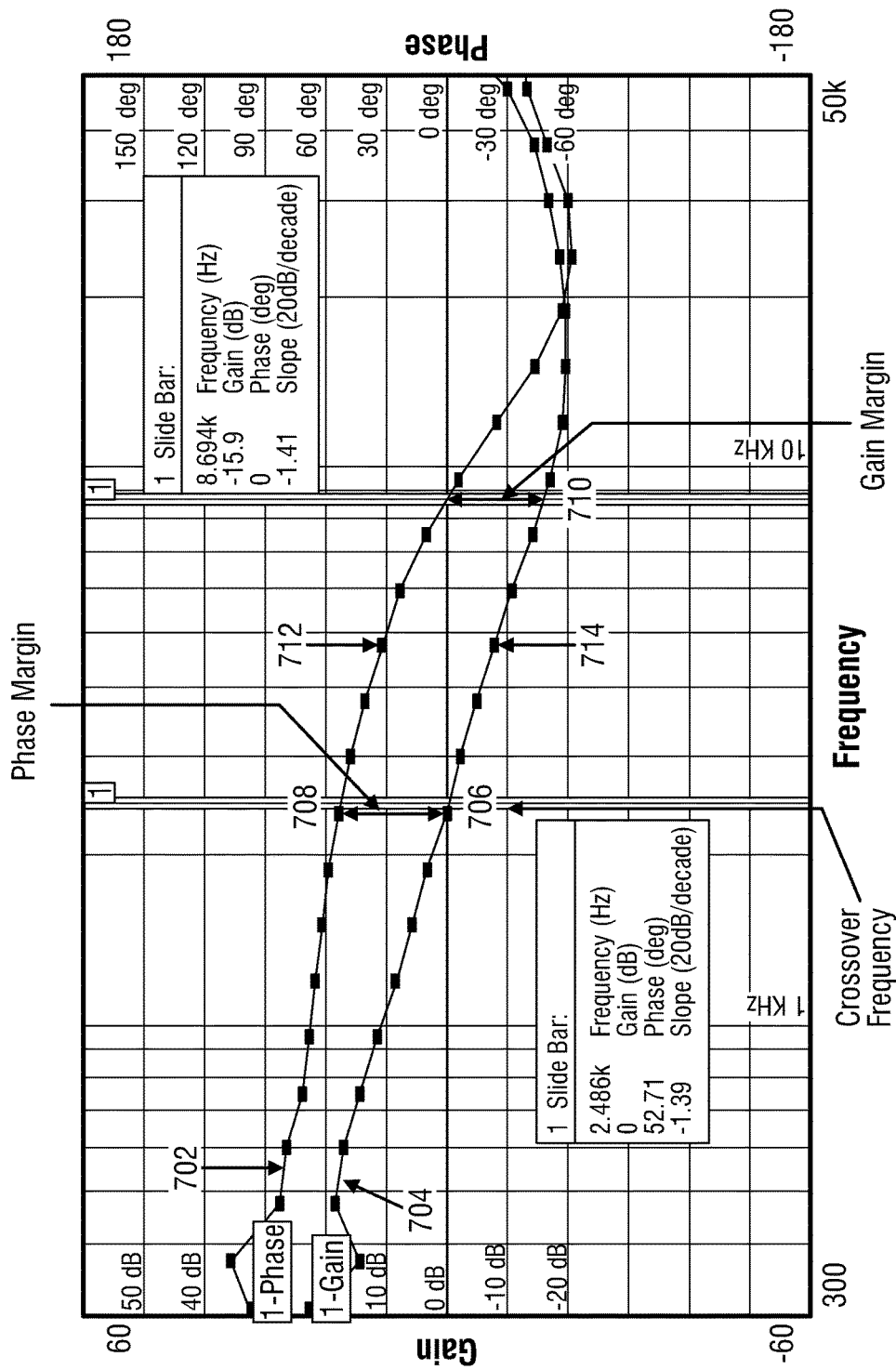
FIG. 7 is a bode plot of a closed loop transfer function according to an embodiment of the present disclosure.

FIG. 7 is a bode plot of a closed loop transfer function according to an embodiment of the present disclosure. A bode plot may simultaneously plot the phase and the gain of the closed loop transfer function over a range of frequencies. For example, the bode plot shown in FIG. 7 shows the phase 702 and gain 704 in an embodiment where the closed loop transfer function applies a total control circuit resistance $R_{OC}$ measuring 1 kΩ to an input signal having a voltage 110V and current of 3 A in order to produce a desired output voltage of 5V. This is only one example embodiment of the present disclosure. Other embodiments may include closed loop transfer functions having different total control circuit resistances $R_{OC}$, different input voltages, different input amperages, and different desired output voltages.

An output signal may be optimized by optimizing the crossover frequency of the output signal. As described above, the crossover frequency of a transfer function may be measured as the frequency at which the gain crosses the 0 dB mark, passing from positive to negative, as shown in FIG. 7 at point 706. As also shown in FIG. 7, the crossover frequency in an embodiment may measure 2.486 Hz. The phase margin may be measured as the phase angle as measured at the crossover frequency, which is illustrated in FIG. 7 at point 708. As also shown in FIG. 7, the phase margin in an embodiment may measure 52.71 degrees. The gain margin may be measured as the gain at the frequency where the phase angle reaches zero degrees, as illustrated in FIG. 7 at point 710. As also shown in FIG. 7, the gain margin in an embodiment may measure −15.9 dB.

As can be seen in FIG. 7, altering the crossover frequency of a transfer function may consequently alter the phase and gain margins. For example, if the phase of the transfer function remained stationary, and the gain shifted to the right such that point 706 were located directly under point 712, the crossover frequency would shift from 2.486 kHz to somewhere around 5 kHz. Consequently, the phase margin would measure much smaller than the 52.71 degree measurement shown in FIG. 7. This is because the phase at that frequency, as shown in FIG. 7 at point 712, measures closer to 30 degrees. Similarly, if the gain were shifted right in such a way, the gain shown in FIG. 7 at point 714 would also shift to the frequency currently shown at point 710. In other words, the gain margin would measure the gain shown at point 714, rather than the gain shown at point 710, thus causing the gain margin to decrease from −15.9 Hz to roughly −8 Hz, or about a 50% decrease. Thus, crossover frequency directly affects both the phase margin and the gain margin of a transfer function.

As such, a crossover frequency may be chosen specifically to optimize the phase and gain margins of the transfer function in an embodiment, in order to enhance the transient response of the signal. The crossover frequency in an embodiment may also be optimized according to several competing factors, including optimizing phase margin and gain margin to avoid ringing, optimizing the switching frequency, inhibiting output ripple, ensuring the absence of a right-half plane zero, and decreasing output undershoot. The optimal signal will generate a crossover frequency that results in more advantages with respect to each of these factors than deleterious effects on each of these factors.

Optimizing the phase margin in an embodiment may consist of choosing a phase margin that provides greater benefits than it does disadvantages. For example, transfer functions with phase margins of 1 degree are theoretically stable, but lower phase margins result in increased risk of signal ringing over a longer period of time. Ringing is a deleterious effect of sharp transitions in signals where the output signal oscillates unnecessarily at a fading rate. Typical phase margins for traditional EA circuits tend to be over 45 degrees, with a phase margin of 60 degrees often allowing for the fastest settling time (dampening of ringing) when adjusting a PWM IC output signal.

Switching frequency is the rate at which the switching device (here, the PWM IC) is turned on and off. Increased switching frequency reduces the size of associated components such as inductors, transformers, resistors and capacitors in addition to reduced space requirements on the board and case of an integrated circuit. However, increased switching frequency may also result in increased noise or risk of signal ringing, as described above. Further, increased switching frequency carries a risk of increased output ripple, or small, unwanted residual periodic variation of the output due to incomplete suppression of the alternating waveform within the power supply. Additional constraints include power load specifications identifying the desired voltage undershoot for signals received by that device. In order to provide the appropriate output to the power load, the crossover frequency chosen must result in a signal providing the specified voltage undershoot. Thus, the optimal crossover frequency will balance each of these competing interests. Finally, once the crossover frequency capable of optimizing each of the factors discussed directly above is identified, the poles and zeroes of the transfer function must be calculated in order to ensure the lack of a right-half plane zero, the existence of which may cause the signal to become unstable.

As described above with reference to the embodiment described in FIG. 6, the crossover frequency of an open loop transfer function may be moved by increasing or decreasing the gain of the closed loop transfer function. In other words, once an optimized crossover frequency is chosen, based on the competing factors described above, the output signal may be altered to generate that crossover frequency by increasing or decreasing the gain produced by the adaptive EA circuit. As also described above, the gain produced by the adaptive EA circuit may be altered during operation of the adaptive EA circuit by altering the total control circuit resistance $R_{OC}$ alone. The open loop transfer function T(s) is dependent upon the variables CTR, $C_1$, $C_C$ $R_C$, $R_p$, $R_1$, and $R_{OC}$, and assuming the variables CTR, $C_1$, $C_C$ $R_C$, $R_p$, and $R_1$ remain fixed following the design phase of the adjustable EA circuit, as they would in a traditional EA circuit, the open loop transfer function T(s) may be altered by changing the value of $R_{OC}$ alone.

Figure 8:
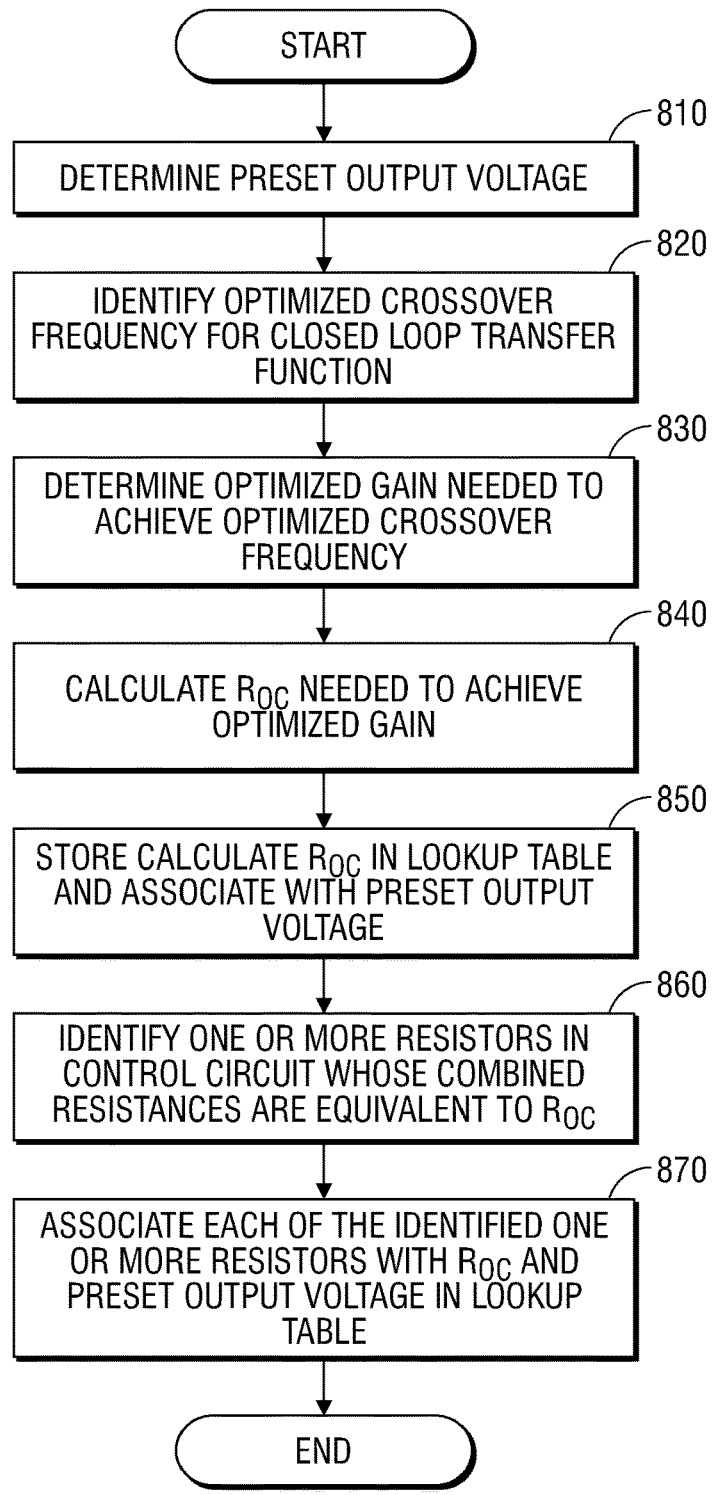
FIG. 8 is a flow diagram illustrating a method of associating a total control circuit resistance with a desired output voltage according to an embodiment of the present disclosure.

FIG. 8 is a flow diagram illustrating a method of associating a total control circuit resistance with a desired output voltage in a lookup table according to an embodiment of the present disclosure. At block 810, in an embodiment, a preset output voltage may be determined. As described above, the USB-C and USB Power Delivery standards define the cables, connectors and communications protocols used in a bus for connection, communication, and power supply between computers and electronic devices. Devices supporting USB Power Delivery (PD) standards finalized in July of 2012 may request higher currents and supply voltages from compliant hosts via PD aware USB cables. PD-aware devices implement a flexible power management scheme by interfacing with the power source through a bi-direction data channel and requesting a certain level of electrical power, including source output voltages of 5V, 9V, 15V, and 20V. The power source, or load in such a scenario may respond by changing its output voltage from one of these four specific power levels to another of these four power levels. As a consequence the flow diagram illustrated in FIG. 8 may be completed in an embodiment for each of the source output voltages of 5V, 9V, 15V, and 20V. For example, at block 810, a preset output voltage of 5V, 9V, 15V, or 20V may be chosen or determined. It is understood that the method of FIG. 8 is not limited to the above listed output voltages and may be applied to other sets of switchable power supply output voltages. Other sets of switchable output power supply voltages are contemplated under different standards or under updates or changes to the USB-PD standard. Methods similar to the current embodiments my apply to yield different lookup tables. Further, the resistor control circuitry may utilize various different resistor combinations to select from options for $R_{OC}$ values to adjust gain.

At block 820 in an embodiment, the optimized crossover frequency for a closed loop transfer function of an adaptable EA circuit operating to enhance the transient response of the determined preset output voltage may be identified. As described above, the use of an error amplifier circuit (EA circuit) in a feedback unidirectional voltage control circuit is one method for correcting voltage transients caused by changes in power supply voltage. The transient response of a signal may be made more stable by changing the crossover frequency of the transfer function. As described above, the adaptable EA circuit in an embodiment may operate to increase or decrease the gain of the output signal, thereby shifting the crossover frequency of the transfer function. As also described above, shifting the crossover frequency of the transfer function may impact several design factors, including optimizing phase margin to avoid ringing, optimizing the switching frequency, inhibiting output ripple, ensuring the absence of a right-half plane zero, and decreasing output undershoot. The optimal output signal will generate a crossover frequency that results in more advantages with respect to each of these factors than deleterious effects on each of these factors.

At block 830 in an embodiment, the optimized gain needed to achieve the optimized crossover frequency may be determined. As described above, the crossover frequency of an open loop transfer function may be moved by increasing or decreasing the gain of the closed loop transfer function. In other words, once an optimized crossover frequency is chosen, based on the competing factors described above, the output signal may be altered to generate that crossover frequency by increasing or decreasing the gain produced by the adaptive EA circuit.

At block 840 in an embodiment, the total control circuit resistance $R_{OC}$ needed to achieve the optimized gain may be calculated. As described above, the gain produced by the adaptive EA circuit may be altered during operation of the adaptive EA circuit by altering the total control circuit resistance $R_{OC}$, alone. As also described above, the open loop transfer function T(s) is dependent upon the variables CTR, $C_1$, $C_C$ $R_C$, $R_p$, $R_1$, and $R_{OC}$, and assuming the variables CTR, $C_1$, $C_C$ $R_C$, $R_p$, and $R_1$ remain fixed following the design phase of the adjustable EA circuit, as they would in a traditional EA circuit, the open loop transfer function T(s) may be altered by changing the value of $R_{OC}$ alone.

At block 850 in an embodiment, the calculated $R_{OC}$ may be stored in a lookup table and associated with the preset output voltage. As described above, during the design phase of the adaptable EA circuit and control circuit, each of the possible total control circuit resistances $R_{OC}$ (associated with one of a plurality of combinations of resistors) may be associated with one of a variety of output voltages, including but not limited to one of the four available USB output voltages, the transient response of which that $R_{OC}$ may enhance. As also described above, the digital core of the power adapter in an embodiment may also include a memory for storing the lookup table.

At block 860, in an embodiment, one or more resistors in the resistance control circuit whose combined resistances are equivalent to the calculated $R_{OC}$ may be identified. For example, as described above, the resistance control circuit may include $R_{OCD}$ through which current always flows and whose resistance is the default total control circuit resistance $R_{OCD}$. Additionally, and as also described above, the automatic variable voltage transient response management system may direct one or more transistors to allow current to flow through one or more of the additional resistors $R_2$, $R_6$, and $R_8$. In such a scenario, the total resistance of the control circuit $R_{OC}$ would be equivalent to the parallel resistance level of the default total resistance $R_{OCD}$ and the resistances of whichever of the additional resistors $R_2$, $R_6$, and $R_8$ through which the automatic variable voltage transient response management system may allow current to flow. For example, the calculated total resistance of the control circuit $R_{OC}$ in an embodiment may be associated with one of eight possible combinations of resistors, including: (1) $R_{OCD}$; (2) $R_{OCD}//R_8$; (3) $R_{OCD}//R_6$; (4) $R_{OCD}//R_2$; (5) $R_{OCD}//R_8//R_6$; (6) $R_{OCD}//R_8//R_2$; (7) $R_{OCD}//R_6//R_2$; and (8) $R_{OCD}//R_8//R_6//R_2$.

At block 870, in an embodiment, each of these combinations of resistors may be listed and the total resistance given by the combination may be associated within the lookup table with the calculated $R_{OC}$ to which it is equivalent, and the preset output voltage whose transient response the calculated $R_{OC}$ is designed to enhance or optimize. For example, the 5V PD voltage output may be associated with the total control circuit resistance generated by directing the flow of current through all of the resistors $R_{OCD}$, $R_2$, $R_6$, and $R_8$, and may be associated with the total control circuit resistance calculated as:

$$R_{OC} = \left(\frac{1}{R_{OCD}} + \frac{1}{R_2} + \frac{1}{R_6} + \frac{1}{R_8}\right)^{-1}$$

As another example, the 20V PD voltage output may be associated with the total control circuit resistance generated by directing the flow of current through the resistors $R_{OCD}$, $R_3$, $R_5$, $R_7$, and $R_8$, and may be associated with the total control circuit resistance calculated as:

$$R_{OC} = \left(\frac{1}{R_{OCD}} + \frac{1}{R_8}\right)^{-1}$$

Figure 9:
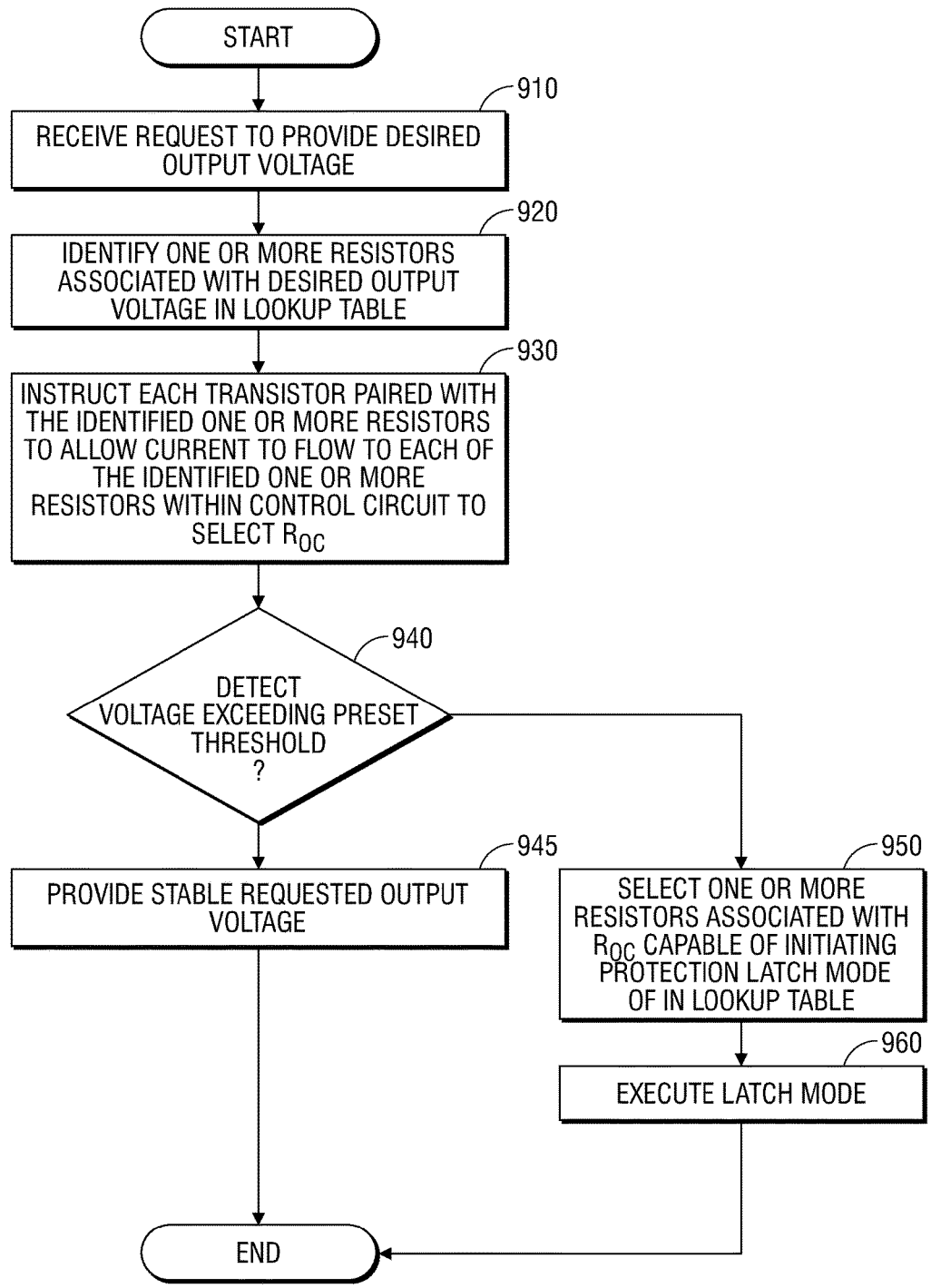
FIG. 9 is a flow diagram illustrating a method of enhancing the transient response of an output signal by altering the total resistance of a control circuit according to an embodiment of the present disclosure.

FIG. 9 is a flow diagram illustrating a method of enhancing the transient response of an output signal by altering the total resistance of a control circuit within an adaptable EA circuit according to an embodiment of the present disclosure. At block 910, in an embodiment, a request to provide a desired output voltage may be received by a power adapter digital core from a power load device. As described above, the adapter digital core of an embodiment may include a processor operating code instructions of the automatic variable voltage transient response management system. The power load may be capable of communicating with the adapter digital core via one or more communications channels in order to request a preset output voltage. For example, in an embodiment, the power load may be capable of communicating a request to the adapter digital core to output one of a variety of output voltages, including but not limited to one of the USB PD approved output voltages (5V, 9V, 15V, or 20V), or to request that the adapter digital core switch from one of the USB PD approved output voltages (e.g. 20V) to another of the USB PD approved output voltages (e.g. 5V).

At block 920, in an embodiment, one or more resistors associated with the desired output voltage may be identified in a lookup table stored in the digital core of the power adapter. As described above, upon receiving the request to switch from one voltage to another, the automatic variable voltage transient response management system in an embodiment may access the lookup table stored in memory of the digital core, and determine which of the eight combinations of resistors the control circuit should employ in order to enhance the transient response of an output signal having the desired output voltage.

At block 930, in an embodiment, each transistor paired with the identified one or more resistors may be instructed to allow current to flow through each of the identified one or more resistors within the control circuit to select $R_{OC}$, in order to generate an optimized total control circuit resistance. As described above, the automatic variable voltage transient response management system in an embodiment may communicate a signal to one or more transistors via general purpose in/out lines activating the transistors of the resistance control circuit to alter a flow of current through a coupled resistor also located within the resistance control circuit. In other words, the automatic variable voltage transient response management system in an embodiment may control one or more transistors in order to place one or more additional resistors in parallel with the default control resistance in the resistance control circuit, thus altering the total control circuit resistance $R_{OC}$. For example, in response to receiving a request to switch from a 20V signal to a 5V signal, the automatic variable voltage transient response management system in an embodiment may access the lookup table, and may identify that the total control circuit resistance $R_{OC}$ associated with a 5V output signal is associated with directing current to flow through resistors $R_{OCD}$, $R_6$, and $R_2$. The automatic variable voltage transient response management system may then activate transistor $Q_1$ (paired with resistor $R_2$) to allow current to flow through resistor $R_2$, activate transistor $Q_2$ (paired with resistor $R_6$) to allow current to flow through resistor $R_6$, and may not activate transistor $Q_3$ (paired with resistor $R_8$). In such a way, upon receipt of a request from the load to change the output voltage, the automatic variable voltage transient response management system in an embodiment may operate to not only provide a near instantaneous change to the requested voltage, but may also immediately shift the operation of the adaptable EA circuit in order to optimize the crossover frequency of the requested voltage.

At block 940, in an embodiment, it may be determined whether an output signal voltage exceeding a preset threshold has been detected. Supply of an output signal having voltage beyond the maximum specifications allowed for a load device may cause damage to the physical components of the load device, and is thus routinely avoided. One method for avoiding such a scenario is the use of a voltage protection circuit. Voltage protection circuits may take many forms, but all perform the basic operation of detecting a voltage exceeding a preset threshold, and in response, closing or latching a circuit gate, sending the incoming overvoltage signal to ground, and thus protecting any downstream components from exposure to a potentially deleterious high voltage. For example, a shunt regulator circuit, such as a TL431 circuit, may function as a voltage protection circuit by receiving a high voltage due to a power surge. In another aspect, in response to the overvoltage condition, rather than passing the signal onto other circuit components, dynamic alteration of the control circuit resistance $R_{OC}$ to a high resistance level such as $R_{OCD}$ during operation of the EA circuit in response to a detected over voltage condition, in combination with the soft start circuit, will limit current and cause no function of the optocoupler. In an example embodiment, $R_{OCD}$ may be set at 0.5 Mohm or more. In a further example, $R_{OCD}$ may be set at 1 Mohm. As a result of the overvoltage and opening the feedback circuit by limiting the optocoupler operation, the PWM integrated circuit will achieve a latch mode and protect the circuit components and load from the overvoltage condition. In embodiments, the over voltage condition in embodiments of the present disclosure provides an alternative to a separate over voltage protection circuit, thereby negating the need for extra parts. If a voltage exceeding a preset threshold is detected, the method may proceed to block 950. If a voltage exceeding a preset threshold is not detected, the method may proceed to block 945.

At block 945, in an embodiment, a stable requested output voltage may be provided to the load. In an embodiment, if an overvoltage condition is not detected, there may be no reason to protect downstream components from the stable signal having the requested output voltage. As such, the stable requested output voltage may be passed through to the load, as requested. The method may then stop.

At block 950, in an embodiment, one or more resistors associated with a total control circuit resistance $R_{OC}$ capable of initiating protection latch mode may be selected from the lookup table. In an embodiment, upon detecting a voltage that exceeds a preset threshold, the automatic variable voltage transient response management system may identify a total control circuit resistance $R_{OC}$ and an associated combination of one or more resistors within the control circuit associated with a latch mode within the lookup table. However in some embodiments, the total control resistance $R_{OC}$ is the default resistance level $R_{OCD}$. Thus, the latch condition triggering total control resistance $R_{OC}$ is the default until the controlled resistors alter that. For example, in the embodiment described with reference to FIG. 3, the bottom row associates activating only the default control circuit resistance $R_{OCD}$ with a LATCH mode. As such, the automatic variable voltage transient response management system may recognize resistors $R_2$, $R_6$, and $R_8$ do not need to be activated, and may not send a signal to activate the paired transistors $Q_1$, $Q_2$, or $Q_3$.

At block 960, in an embodiment, the latch mode may be executed. For example, in an embodiment, the effective removal of the resistors $R_2$, $R_6$, and $R_8$ from the control circuit may increase the total control circuit resistance $R_{OC}$ upwards to a maximum level such as $R_{OCD}$ to force the output signal of the adaptive EA circuit to fall outside of the operating specifications of the soft start circuit and for the optocoupler to cease providing feedback to the PWM circuit. The stopping of the optocoupler feedback to the PWM circuit will cause the high voltage side transformer to trigger a latch condition in the open feedback scenario. Thus, the combination of the automatic variable voltage transient response management system altering the total control circuit resistance $R_{OC}$ and the use of the soft start circuit may be used in an embodiment in lieu of an extra voltage protection circuit. At this point, the flow may end.

The blocks of the flow diagrams discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating an automatic variable voltage transient response management system comprising:
    a switchable power regulator circuit for receiving alternating current (AC) input voltage and generating a plurality of direct current (DC) output voltages for an information handling system including:
        a rectifier and a pulse-width modulation circuit operable to receive an input AC voltage; and
        a transformer to generate one of the plurality of DC output voltages being operably connected in a feedback loop for an adaptable error amplifier circuit;
    a memory for storing a control circuit resistance table;
    the adaptable error amplifier circuit of the switchable power regulator circuit being operable to generate a reference voltage, compare the DC output voltage, and to regulate each of the plurality of DC output voltages for output voltage stability, wherein each of the plurality of DC output voltages is associated in the control circuit resistance table with one of a plurality of total control circuit resistances to adapt the error amplifier circuit feedback gain; and
    a digital core processor executing code instructions of the automatic variable voltage transient response management system to determine a requested regulated DC output voltage, identify one of the plurality of the total control circuit resistances associated with the requested regulated DC output voltage of the plurality of DC output voltages in the controller resistance table, and to activate an adaptable resistance control circuit to apply the identified total control circuit resistance.

2. The information handling system operating the automatic variable voltage transient response management system of claim 1 further comprising:
    the adaptable resistance control circuit including a default resistor operating in parallel with one or more of a plurality of controlled resistors to generate one of the plurality of total control circuit resistances by selective activation of the parallel controlled resistors.

3. The information handling system operating the automatic variable voltage transient response management system of claim 2 further comprising:
    one or more controller transistors, each controller transistor placed in series with one of the plurality of controlled resistors to activate the controlled resistors upon receiving a general purpose input/output (GPIO) signal to the gate of the in-series controller transistor.

4. The information handling system operating the automatic variable voltage transient response management system of claim 1 further comprising:
    a soft start circuit operably connected to the adaptable error amplifier circuit operating to cause a startup current and a startup output voltage to rise linearly following startup of a load.

5. The information handling system operating the automatic variable voltage transient response management system of claim 1 further comprising:
    the processor executing machine readable executable code instructions of the automatic variable voltage transient response management system to detect an output voltage exceeding a preset voltage threshold, to identify a protective total control circuit resistance capable of initiating a protection latch mode, and to direct the adaptable resistance control circuit to apply the identified protective total control circuit resistance.

6. The information handling system operating the automatic variable voltage transient response management system of claim 1, wherein the identified total control circuit resistance for determining feedback gain needed to achieve the optimized crossover frequency associated with the requested regulated DC output voltage is determined by optimizing a crossover frequency of the requested regulated DC output voltage for one or more optimization characteristics.

7. The information handling system operating the automatic variable voltage transient response management system of claim 6, wherein the one or more optimization characteristics include phase margin, switching frequency, output ripple, output undershoot, or absence of a right half-plane zero.

8. A method of automatically managing transient response of a switchable power regulator circuit for a plurality of preset regulated output voltages comprising:
    identifying, via a processor a total control circuit resistance for generating an adaptable error amplifier circuit feedback gain needed to achieve a crossover frequency of one of the plurality of preset regulated output voltages optimized for one or more optimization characteristics;
    associating the total control circuit resistance with the one of the plurality of preset regulated output voltages having an optimized crossover frequency in a control circuit resistance table stored in a memory associating each of the plurality of preset regulated output voltages with one of a plurality of total control circuit resistances for adapting the adaptable error amplifier circuit feedback gain;
generating, via a transformer of a switchable power regulator circuit operably connected in a feedback loop for the adaptable error amplifier circuit, the one of the plurality of preset regulated output voltages associated with the total control circuit resistance in the control circuit resistance table;
determining, via a processor, a requested regulated output voltage equivalent to the one of the plurality of preset regulated output voltages associated with the total control circuit resistance in the control circuit resistance table;
adapting the adaptable error amplifier circuit gain by activating an adaptable resistance control circuit to apply the total control circuit resistance associated with the one of the plurality of preset regulated output voltages to regulate the one of the plurality of preset regulated output voltages for output voltage stability.

9. The method of automatically managing transient response of multiple output voltages of claim 8 further comprising:
applying the total control circuit resistance associated with the one of the plurality of preset regulated output voltages by selectively activating one or more parallel controlled resistors operating in parallel with a default resistor of the adaptable resistance control circuit.

10. The method of automatically managing transient response of multiple output voltages of claim 9 further comprising:
activating the one or more parallel controlled resistors upon receiving a general purpose input/output (GPIO) signal to the gate of a controller transistor placed in series with the one or more parallel controlled resistors.

11. The method of automatically managing transient response of multiple output voltages of claim 8, wherein the one or more optimization characteristics includes phase margin, switching frequency, output ripple, output undershoot, or absence of a right half-plane zero.

12. The method of automatically managing transient response of multiple output voltages of claim 8, wherein the plurality of preset regulated output voltages includes 5V, 9V, 15V, and 20V.

13. The method of automatically managing transient response of multiple output voltages of claim 8 further comprising:
causing a startup current and a startup output voltage to rise linearly following startup of a load, via a soft start circuit operably connected to the adaptable error amplifier circuit.

14. The method of automatically managing transient response of multiple output voltages of claim 8 further comprising:
detecting an output voltage exceeding a preset voltage threshold;
identifying a protective total control circuit resistance within the control circuit resistance table capable of initiating a protection latch mode of the switchable power regulator circuit; and
directing the adaptable resistance control circuit to apply the identified protective total control circuit resistance.

15. A switchable power regulator circuit operating an automatic variable voltage transient response management system for an information handling system comprising:
the switchable power regulator circuit receiving alternating current (AC) input voltage and generating a plurality of direct current (DC) output voltages for an information handling system;
a memory for storing a control circuit resistance table associating a total control circuit resistance for adjusting gain with each of the plurality of DC output voltages;
the switchable power regulator circuit including a transformer operable to generate a DC output voltage selected from the plurality of DC output voltages;
the transformer being operably connected in a feedback loop for an adaptable error amplifier circuit;
the adaptable error amplifier circuit generating a reference voltage, comparing the reference voltage to the DC output voltage to regulate the DC output voltage for stability, wherein each of the plurality of DC output voltages is associated in the control circuit resistance table with one of a plurality of total control circuit resistances to adapt the error amplifier circuit feedback gain;
a processor executing machine readable executable code instructions of the automatic variable voltage transient response management system to determine a requested regulated DC output voltage, identify one of a plurality of total control circuit resistances associated with the requested regulated DC output voltage of the plurality of DC output voltages in the controller resistance table, and to activate an adaptable resistance control circuit to apply the identified total control circuit resistance;
the adaptable resistance control circuit including a default resistor operating in parallel with one or more of a plurality of controlled resistors to generate one of the plurality of total control circuit resistances by selective activation of the parallel controlled resistors.

16. The switchable power regulator circuit operating the automatic variable voltage transient response management system of claim 15 further comprising:
a soft start circuit operably connected to the adaptable error amplifier circuit operating to cause a startup current and a startup output voltage to rise linearly following startup of a load.

17. The switchable power regulator circuit operating the automatic variable voltage transient response management system of claim 15 further comprising:
one or more controller transistors, each controller transistor placed in series with one of the plurality of controlled resistors; and
the processor sending a general purpose input/output (GPIO) signal to selectively activate at least one controller transistor associated with the controlled resistor to generate the total control circuit resistance.

18. The switchable power regulator circuit operating the automatic variable voltage transient response management system of claim 17 further comprising:
the processor executing machine readable executable code instructions of the automatic variable voltage transient response management system to detect an output voltage exceeding a preset voltage threshold, identify a protective total control circuit resistance within the controller resistance table capable of initiating a protection latch mode, and to direct the adaptable resistance control circuit to apply the identified protective total control circuit resistance.

19. The switchable power regulator circuit operating the automatic variable voltage transient response management system of claim 15, wherein the identified total control circuit resistance is determined by optimizing a crossover frequency of the requested regulated DC output voltage for one or more optimization characteristics and determining a gain needed to achieve the optimized crossover frequency.

20. The switchable power regulator circuit operating the automatic variable voltage transient response management system of claim 19, wherein the one or more optimization characteristics include phase margin, switching frequency, output ripple, output undershoot, or absence of a right half-plane zero.

* * * * *